(12) United States Patent
Chen et al.

(10) Patent No.: US 11,455,075 B2
(45) Date of Patent: Sep. 27, 2022

(54) DISPLAY METHOD WHEN APPLICATION IS EXITED AND TERMINAL

(71) Applicant: HUAWEI TECHNOLOGIES CO., LTD., Guangdong (CN)

(72) Inventors: Xiaoxiao Chen, Nanjing (CN); Weijun Xiao, Wuhan (CN); Qingyu Cui, Wuhan (CN); Jie Liu, Shanghai (CN); Ling Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/041,281

(22) PCT Filed: Apr. 19, 2018

(86) PCT No.: PCT/CN2018/083759
§ 371 (c)(1),
(2) Date: Sep. 24, 2020

(87) PCT Pub. No.: WO2019/200588
PCT Pub. Date: Oct. 24, 2019

(65) Prior Publication Data
US 2021/0109644 A1      Apr. 15, 2021

(51) Int. Cl.
*G06F 3/04817* (2022.01)
*G06F 3/0482* (2013.01)
(Continued)

(52) U.S. Cl.
CPC ...... *G06F 3/04817* (2013.01); *G06F 3/04845* (2013.01); *G06F 9/451* (2018.02); *G06F 3/0482* (2013.01)

(58) Field of Classification Search
CPC .. G06F 3/0481; G06F 3/04817; G06F 3/0482; G06F 3/04842; G06F 3/04845; G06F 9/451
See application file for complete search history.

(56) References Cited

U.S. PATENT DOCUMENTS 9,535,600 B2   1/2017  Lee et al.
9,910,524 B1   3/2018  Wells et al.
(Continued)

FOREIGN PATENT DOCUMENTS

CN    102413229 A    4/2012
CN    102566930 A    7/2012
(Continued)

*Primary Examiner* — Linda Huynh
(74) *Attorney, Agent, or Firm* — Womble Bond Dickinson (US) LLP

(57) ABSTRACT

This application discloses a display method when an application is exited and a terminal. The method includes: receiving, by a terminal, a keyword entered by a user into a search bar; displaying, by the terminal, a search result associated with the keyword; receiving, by the terminal, a first operation of the user for opening a first application from the search result; opening, by the terminal, the first application in response to the first operation; receiving, by the terminal, a second operation of the user for exiting the first application; and exiting, by the terminal, the first application in response to the second operation, and displaying a display screen on which an icon of the first application is located, where a size of the icon of the first application on the display screen is a first size.

17 Claims, 41 Drawing Sheets

(51) Int. Cl.
*G06F 9/451* (2018.01)
*G06F 3/04845* (2022.01)

(56) References Cited

U.S. PATENT DOCUMENTS

| | | | |
|---|---|---|---|
| 9,953,101 B1 | 4/2018 | Walliser | |
| 2009/0307626 A1* | 12/2009 | Jalon | G06F 16/168 715/771 |
| 2010/0231533 A1* | 9/2010 | Chaudhri | G06F 3/0485 345/173 |
| 2010/0313164 A1* | 12/2010 | Louch | G06F 3/0481 715/790 |
| 2011/0138325 A1* | 6/2011 | Yang | G06F 3/04883 715/800 |
| 2011/0252375 A1 | 10/2011 | Chaudhri et al. | |
| 2012/0071208 A1* | 3/2012 | Lee | G06F 3/04842 455/566 |
| 2012/0179969 A1* | 7/2012 | Lee | G06F 3/017 715/719 |
| 2013/0086523 A1 | 4/2013 | Imamura | |
| 2013/0218870 A1 | 8/2013 | Bukurak et al. | |
| 2013/0218923 A1 | 8/2013 | Kaul et al. | |
| 2013/0268877 A1* | 10/2013 | Han | G06F 3/04845 715/764 |
| 2013/0332886 A1 | 12/2013 | Cranfill et al. | |
| 2014/0173517 A1* | 6/2014 | Chaudhri | G06F 3/0485 715/830 |
| 2014/0232671 A1* | 8/2014 | Chaudhri | G06F 3/04883 345/173 |
| 2014/0267103 A1 | 9/2014 | Chaudhri | |
| 2014/0282110 A1 | 9/2014 | Chaudhri | |
| 2014/0282208 A1* | 9/2014 | Chaudhri | G06F 3/04883 715/779 |
| 2014/0351748 A1* | 11/2014 | Xia | G06F 3/0481 715/798 |
| 2015/0135109 A1* | 5/2015 | Zambetti | G06F 3/03547 715/767 |
| 2015/0207920 A1 | 7/2015 | Choi et al. | |
| 2015/0309689 A1* | 10/2015 | Jin | G06F 3/04883 715/765 |
| 2016/0066140 A1 | 3/2016 | Gnanasekaran | |
| 2016/0077720 A1* | 3/2016 | Park | G06F 3/04817 715/765 |
| 2016/0110094 A1 | 4/2016 | Kim et al. | |
| 2016/0266788 A1* | 9/2016 | Park | G06F 3/0482 |
| 2016/0357577 A1 | 12/2016 | Gao et al. | |
| 2017/0046441 A1 | 2/2017 | Lee et al. | |
| 2017/0053314 A1 | 2/2017 | Glover et al. | |
| 2017/0109011 A1* | 4/2017 | Jiang | G10L 15/22 |
| 2017/0154609 A1 | 6/2017 | Yoon et al. | |
| 2018/0011630 A1 | 1/2018 | Kim et al. | |
| 2018/0067596 A1 | 3/2018 | Wells et al. | |
| 2018/0136819 A1* | 5/2018 | Lee | G06F 3/04817 |
| 2019/0179500 A1 | 6/2019 | Kim et al. | |
| 2022/0021714 A1 | 1/2022 | Hwang et al. | |

FOREIGN PATENT DOCUMENTS

| | | |
|---|---|---|
| CN | 102857629 A | 1/2013 |
| CN | 103902363 A | 7/2014 |
| CN | 104238927 A | 12/2014 |
| CN | 104598104 A | 5/2015 |
| CN | 104881207 A | 9/2015 |
| CN | 105843468 A | 8/2016 |
| CN | 106095248 A | 11/2016 |
| CN | 106354372 A | 1/2017 |
| CN | 106406924 A | 2/2017 |
| CN | 106708362 A | 5/2017 |
| CN | 106873852 A | 6/2017 |
| CN | 107038032 A | 8/2017 |
| CN | 107678618 A | 2/2018 |
| KR | 20150099430 A | 8/2015 |
| WO | 2015058599 A1 | 4/2015 |
| WO | 2017032089 A1 | 3/2017 |
| WO | 2017075515 A1 | 5/2017 |

\* cited by examiner

DISPLAY METHOD WHEN APPLICATION IS EXITED AND TERMINAL

CROSS-REFERENCE TO RELATED APPLICATIONS

This application is a national stage of International Application No. PCT/CN2018/083759, filed on Apr. 19, 2018, which application is herein incorporated by reference in its entirety.

TECHNICAL FIELD

Embodiments of this application relate to the terminal field, and in particular, to a display method when an application is exited and a terminal.

BACKGROUND

A plurality of applications are usually installed on a terminal such as a mobile phone, and a user operates these applications, so that various application functions can be implemented. Generally, the user may tap an application icon displayed on a home screen to open a corresponding application. In this case, the terminal may record a tapping location of the user on the home screen, or record a location of the application icon on the home screen. For example, as shown in FIG. 1(a), a location of an icon 11 of WECHAT®, a social media messaging application on a home screen is a point A on a display screen.

In this case, when the user performs an operation for exiting the WECHAT® application (for example, taps a back button 12), as shown in FIG. 1(c) and FIG. 1(d), the terminal may use the home screen as a background, use the point A as a scale center, and gradually scale down an application screen 13 displayed when the WECHAT® application is exited, until the entire home screen shown in FIG. 1(a) is displayed. In such a dynamic application exit manner, the user may be guided to accurately and quickly search for and locate an application.

However, when the user opens an application by using another entrance (for example, a search bar or a pull-down menu) other than the home screen, because a location of the application on the another entrance may be different from that on the home screen, if a dynamic scale special effect is presented still by using the foregoing method when the application is exited, the terminal cannot return to the home screen on which the application is located, and consequently the user cannot be guided to locate the application.

SUMMARY

Embodiments of this application provide a display method when an application is exited and a terminal. In response to an operation of a user, a terminal may automatically exit the application, and then automatically display a display screen on which an icon of the application is located, to guide the user to quickly and accurately locate the application.

According to a first aspect, an embodiment of this application provides a display method when an application is exited, including: A terminal receives a keyword entered by a user into a search bar. Further, the terminal displays a search result associated with the keyword. If the terminal receives a first operation of the user for opening a first application from the search result, the terminal may open the first application. Subsequently, if the terminal receives a second operation of the user for exiting the first application, after exiting the first application, the terminal may display a display screen on which an icon of the first application is located, where a size of the icon of the first application on the display screen is a first size.

In other words, after the user opens an application (namely, the first application) by using an entrance, namely, the search bar, the terminal may automatically exit the first application in response to the second operation, and automatically return to the display screen on which the icon of the first application is located, to guide the user to quickly and accurately locate the first application on a home screen, and implement a display effect of dynamically locating an application location when the application is exited.

For example, the display screen on which the icon of the first application is located may be any display screen of the home screen.

In one embodiment, the search bar may be located on the home screen, a home screen assistant (e.g., HIBOARD®), a pull-down menu, or a pull-up menu of the terminal.

In one embodiment, the search result may specifically include at least one of a link of the first application or the icon of the first application.

In one embodiment, that the terminal exits the first application in response to the second operation, and displays the display screen on which the icon of the first application is located specifically includes: the terminal may gradually scale down an application screen of the first application in response to the second operation, and finally display the display screen on which the icon of the first application is located.

In other words, the terminal may add some animation effects in a time period from exiting the first application to displaying the display screen on which the icon of the first application is located, to improve fun and guidance when the application is exited.

In one embodiment, after the terminal scales down the application screen of the first application, and before the terminal displays the display screen on which the icon of the first application is located, the method further includes: The terminal may change the scaled-down application screen to an icon of the first application with a second size, where the second size is not less than the first size.

In one embodiment, after the terminal changes the scaled-down application screen to the icon of the first application with the second size, the method further includes: The terminal scales down the icon of the first application with the second size, where the second size is greater first size.

In other words, specific content of an element to be dynamically scaled down when the terminal exits the first application may change, to present a more vivid animation effect to the user when the application is exited, and guide the user to locate the exited first application on the home screen.

In addition, when scaling down the application screen of the first application, the terminal may gradually scale down the application screen of the first application by using a location of the icon of the first application on the display screen as a center. Similarly, in a process in which the terminal scales down the icon of the first application with the second size, the terminal may gradually scale down the icon of the first application with the second size by using the location of the icon of the first application on the display screen as a center. In this way, when the first application is exited, the user can accurately locate a specific location of the first application on the home screen.

In this embodiment of this application, when the user opens the first application from the HIBOARD®, a multi-task management screen, a lock screen, the pull-down menu, or the pull-up menu, when exiting the first application, the terminal may still return to the display screen on which the icon of the first application is located, to guide the user to quickly and accurately locate the first application on the home screen.

For example, the user opens the first application from the HIBOARD®. The terminal may receive the first operation of the user for opening the first application from the HIBOARD®. In response to the first operation, the terminal may open the first application. Subsequently, if the terminal receives the second operation of the user for exiting the first application, the terminal may exit the first application in response to the second operation, and display the display screen on which the icon of the first application is located. The icon of the first application may be located on any display screen, not adjacent to the HIBOARD®, of the home screen.

For example, the user opens the first application from the multi-task management screen. The terminal may receive the first operation of the user for opening the first application from the multi-task management screen. In response to the first operation, the terminal may open the first application. Subsequently, if the terminal receives the second operation of the user for exiting the first application, the terminal may exit the first application in response to the second operation, and display the display screen on which the icon of the first application is located. The icon of the first application is not on a home screen on which the terminal stays before the terminal enters the multi-task management screen.

For example, the user opens the first application from the lock screen. The terminal may receive the first operation of the user for opening the first application from the lock screen. In response to the first operation, the terminal may open the first application. Subsequently, if the terminal receives the second operation of the user for exiting the first application, the terminal may exit the first application in response to the second operation, and display the display screen on which the icon of the first application is located. The icon of the first application is not on a home screen on which the terminal stays before the terminal locks the screen.

For example, the user opens the first application from the pull-down menu or the pull-up menu. The terminal may receive the first operation of the user for opening the first application from the pull-down menu or the pull-up menu. In response to the first operation, the terminal may open the first application. Subsequently, if the terminal receives the second operation of the user for exiting the first application, the terminal may exit the first application in response to the second operation, and display the display screen on which the icon of the first application is located. The icon of the first application is not on a home screen on which the terminal stays before the terminal opens the pull-down menu (or the pull-up menu).

In this way, when the user opens an application (namely, the first application) by using a target entrance other than the home screen, when exiting the first application, the terminal may still accurately return to the display screen on which the icon of the first application is located, to guide the user to quickly and accurately locate the first application on the home screen.

According to a second aspect, an embodiment of this application provides a display method when an application is exited, including: A terminal receives a first operation of a user for opening a second application, where an icon of the second application is located in a folder. The terminal opens the second application in response to the first operation. Subsequently, if the terminal receives a second operation of the user for exiting the second application, the terminal may exit the second application in response to the second operation, and display a display screen including the folder, where the folder is in a closed state.

For example, the display screen including the folder is any display screen of a home screen.

It can be learned that the terminal automatically exits the second application in response to the second operation of the user, and automatically displays the display screen including the folder, and the icon of the second application is located in the folder. Therefore, the user can be guided to quickly and accurately locate the first application on the home screen, and a display effect of dynamically locating the application when the application is exited is implemented.

In one embodiment, that the terminal receives a first operation of a user for opening a second application specifically includes: The terminal receives the first operation of the user for opening the second application from the folder on the home screen; or the terminal receives the first operation of the user for opening the second application by using a target entrance, where the target entrance includes at least one of HIBOARD®, a search bar, a multi-task management screen, a lock screen, a pull-down menu, or a pull-up menu.

In other words, regardless of whether the user opens the second application from the folder on the home screen or the user opens the second application by using an entrance other than the home screen, when exiting the second application, the terminal may accurately return to the display screen on which the folder of the second application is located, to guide the user to quickly and accurately locate the second application on the home screen.

In one embodiment, a size of the folder in the closed state on the display screen is a first folder size, a size of the icon of the second application in the folder in the closed state is a first icon size, and the first icon size is less than the first folder size.

That the terminal exits the second application in response to the second operation, and displays the display screen including the folder specifically includes: The terminal scales down an application screen of the second application in response to the second operation, and displays the display screen including the folder. In other words, the terminal may add some animation effects in a time period from exiting the second application to displaying the display screen, to improve fun and guidance when the application is exited.

In one embodiment, after the terminal scales down the application screen of the second application, and before the terminal displays the display screen including the folder, the method further includes: The terminal may change the scaled-down application screen to an icon of the second application with a second icon size, where the second icon size is not less than the first icon size.

In this case, after the terminal changes the scaled-down application screen to the icon of the second application with the second icon size, the method further includes: The terminal may scale down the icon of the second application with the second icon size. In this case, the second icon size is greater than the first icon size.

In other words, specific content of an element to be dynamically scaled down when the terminal exits the second application may change, to present a more vivid animation effect to the user when the application is exited, and guide the user to locate the exited first application on the home screen.

In addition, when scaling down the application screen of the second application, the terminal may gradually scale down the application screen of the second application by using a location of the folder in the closed state as a center. Similarly, in a process in which the terminal scales down the icon of the second application with the second icon size, the terminal may also gradually scale down the icon of the second application with the second icon size by using the location of the folder in the closed state as a center. In this way, when the second application is exited, the user can accurately locate a specific location of the second application on the home screen.

Alternatively, after the terminal scales down the application screen of the second application, and before the terminal displays the display screen including the folder, the method further includes: The terminal may change the scaled-down application screen to the folder in an open state, where a size of the folder in the open state is a second folder size, and the second folder size is not less than the first folder size.

After the terminal changes the scaled-down application screen to the folder in the open state, the method further includes: The terminal scales down the folder in the open state.

In other words, when exiting the second application, the terminal may further exit the second application and return to the folder in which the second application is located. In this case, the folder is in the open state. Then, the terminal returns, from the opened folder, to the display screen on which the folder is located. In this case, the folder is in the closed state. In this way, a process in which the terminal exits a WECHAT® application is in full correspondence with a process in which the user opens the WECHAT® application from the home screen. This can improve friendliness of interaction between the terminal and the user while helping the user locate the WECHAT® application.

In this case, when scaling down the application screen of the second application, the terminal may gradually scale down the application screen of the second application by using a location of the folder in the open state as a center. In a process of scaling down the folder in the open state, the terminal may gradually scale down the folder in the open state by using the location of the folder in the closed state as a center. In this way, when the second application is exited, the user can accurately locate a specific location of the second application on the home screen.

In one embodiment, the folder in the open state includes an icon of the second application with a third icon size, and the third icon size is equal to the first folder size.

According to a third aspect, an embodiment of this application provides a terminal, including one or more processors, a memory, an input device, and a display. The memory, the input device, and the display are coupled to the one or more processors. The memory is configured to store computer program code. The computer program code includes a computer instruction. When the one or more processors execute the computer instruction, the input device is configured to: receive a keyword entered by a user into a search bar, and receive a first operation of the user for opening a first application from the search result; and the processor is configured to: control the display to display the search result associated with the keyword, open the first application in response to the first operation, exit the first application in response to a second operation, and control the display to display a display screen on which an icon of the first application is located, where a size of the icon of the first application on the display screen is a first size.

In one embodiment, the processor is configured to scale down an application screen of the first application, and control the display to display the display screen on which the icon of the first application is located.

In one embodiment, the processor is further configured to change the scaled-down application screen to an icon of the first application with a second size, where the second size is not less than the first size.

In one embodiment, the processor is further configured to scale down the icon of the first application with the second size, where the second size is greater than the first size.

According to a fourth aspect, an embodiment of this application provides a terminal, including one or more processors, a memory, an input device, and a display. The memory, the input device, and the display are coupled to the one or more processors. The memory is configured to store computer program code. The computer program code includes a computer instruction. When the one or more processors execute the computer instruction, the input device is configured to: receive a first operation of a user for opening a second application, where an icon of the second application is located in a folder, and receive a second operation of the user for exiting the second application; and the processor is configured to: open the second application in response to the first operation, exit the second application in response to the second operation, and control the display to display a display screen including the folder, where the folder is in a closed state.

In one embodiment, the input device is specifically configured to receive the first operation of the user for opening the second application from the folder on a home screen, or receive the first operation of the user for opening the second application by using a target entrance, where the target entrance includes at least one of HIBOARD®, a search bar, a multi-task management screen, a lock screen, a pull-down menu, or a pull-up menu.

In one embodiment, a size of the folder in the closed state on the display screen is a first folder size, a size of the icon of the second application in the folder in the closed state is a first icon size, and the first icon size is less than the first folder size. The processor is specifically configured to: control the display to scale down an application screen of the second application in response to the second operation, and control the display to display the display screen including the folder.

In one embodiment, the processor is further configured to change the scaled-down application screen to an icon of the second application with a second icon size, where the second icon size is not less than the first icon size.

In one embodiment, the processor is further configured to scale down the icon of the second application with the second icon size, where the second icon size is greater than the first icon size.

In one embodiment, the processor is further configured to change the scaled-down application screen to the folder in an open state, where a size of the folder in the open state is a second folder size, and the second folder size is not less than the first folder size.

In one embodiment, the processor is further configured to scale down the folder in the open state.

According to a fifth aspect, an embodiment of this application provides a terminal, including an obtaining unit, a processing unit, and a display unit. The obtaining unit is configured to: receive a keyword entered by a user into a search bar, receive a first operation of the user for opening a first application from the search result, and receive a second operation of the user for exiting the first application. The processing unit is configured to: search for a search result associated with the keyword, open the first application, and exit the first application. The display unit is configured to: display the search result associated with the keyword, and display a display screen on which an icon of the first application is located, where a size of the icon of the first application on the display screen is a first size.

In one embodiment, the processing unit is specifically configured to scale down an application screen of the first application and display the display screen on which the icon of the first application is located.

In one embodiment, the processing unit is further configured to change the scaled-down application screen to an icon of the first application with a second size, where the second size is not less than the first size.

In one embodiment, the processing unit is further configured to scale down the icon of the first application with the second size, where the second size is greater than the first size.

According to a sixth aspect, an embodiment of this application provides a terminal, including an obtaining unit, a processing unit, and a display unit. The obtaining unit is configured to: receive a first operation of a user for opening a second application, where an icon of the second application is located in a folder, and receive a second operation of the user for exiting the second application. The processing unit is configured to open the second application and exit the second application. The display unit is configured to display a display screen including the folder, where the folder is in a closed state.

In one embodiment, the obtaining unit is specifically configured to receive the first operation of the user for opening the second application from the folder on a home screen, or receive the first operation of the user for opening the second application by using a target entrance, where the target entrance includes at least one of HIBOARD®, a search bar, a multi-task management screen, a lock screen, a pull-down menu, or a pull-up menu.

In one embodiment, a size of the folder in the closed state on the display screen is a first folder size, a size of the icon of the second application in the folder in the closed state is a first icon size, and the first icon size is less than the first folder size.

In one embodiment, the processing unit is configured to scale down an application screen of the second application and display the display screen including the folder.

In one embodiment, the processing unit is further configured to change the scaled-down application screen to an icon of the second application with a second icon size, where the second icon size is not less than the first icon size.

In one embodiment, the processing unit is further configured to scale down the icon of the second application with the second icon size, where the second icon size is greater than the first icon size.

In one embodiment, the processing unit is further configured to change the scaled-down application screen to the folder in an open state, where a size of the folder in the open state is a second folder size, and the second folder size is not less than the first folder size.

In one embodiment, the processing unit is further configured to scale down the folder in the open state.

According to a seventh aspect, a computer storage medium is provided, including a computer instruction. When the computer instruction is run on a terminal, the terminal is enabled to perform the display method when an application is exited according to any one of the foregoing implementations.

According to an eighth aspect, a computer program product is provided. When the computer program product is run on a computer, the computer is enabled to perform the display method when an application is exited according to any one of the foregoing implementations.

It may be understood that, the terminals provided in the third to the sixth aspects, the computer storage medium provided in the seventh aspect, and the computer program product provided in the eighth aspect are all configured to perform the foregoing corresponding methods. Therefore, for beneficial effects that can be achieved by the terminals, the computer storage medium, and the computer program product, refer to beneficial effects in the foregoing corresponding methods. Details are not described herein again.

In the foregoing solutions, the first operation may be an operation such as tapping, touching and holding, or swiping. The second operation may be an operation such as tapping a back button, pressing a home button, or pressing a power button.

DESCRIPTION OF EMBODIMENTS

An application installed on a terminal may be displayed in a form of an icon on a home screen, to provide a user with an entrance for opening a related application.

Figure 1A:
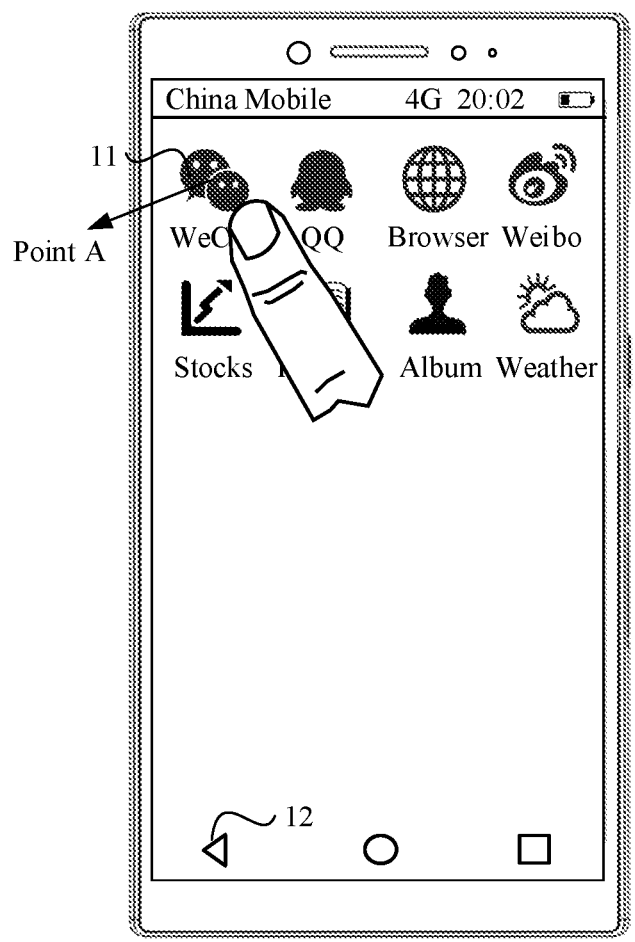
FIG. 1(a) to FIG. 1(d) are schematic diagrams of an application scenario when an application is exited in the prior art.
Figure 1B:
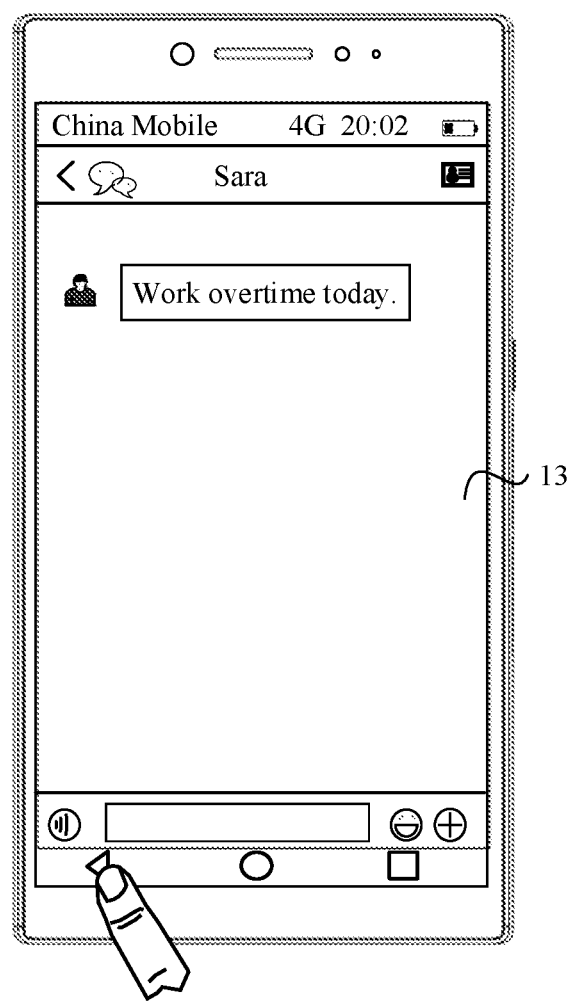
Figure 1C:
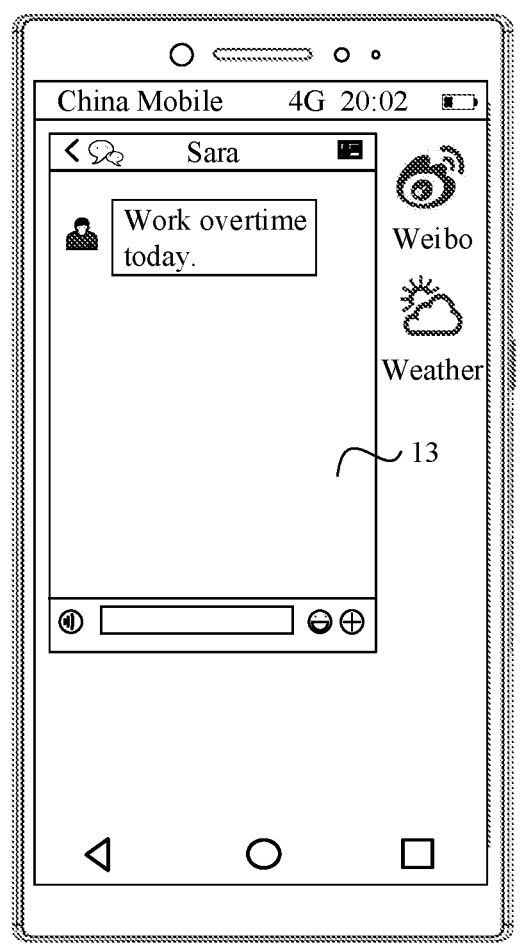
Figure 1D:
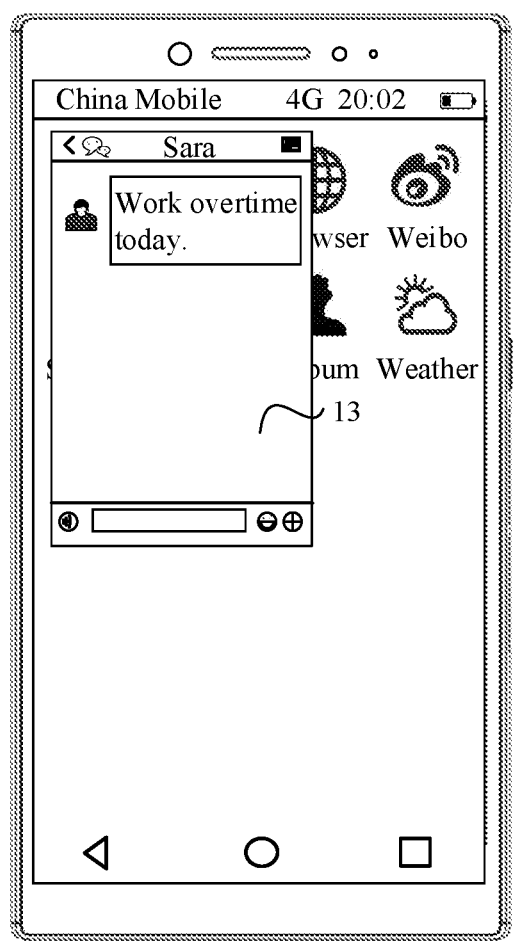
Figure 2A:
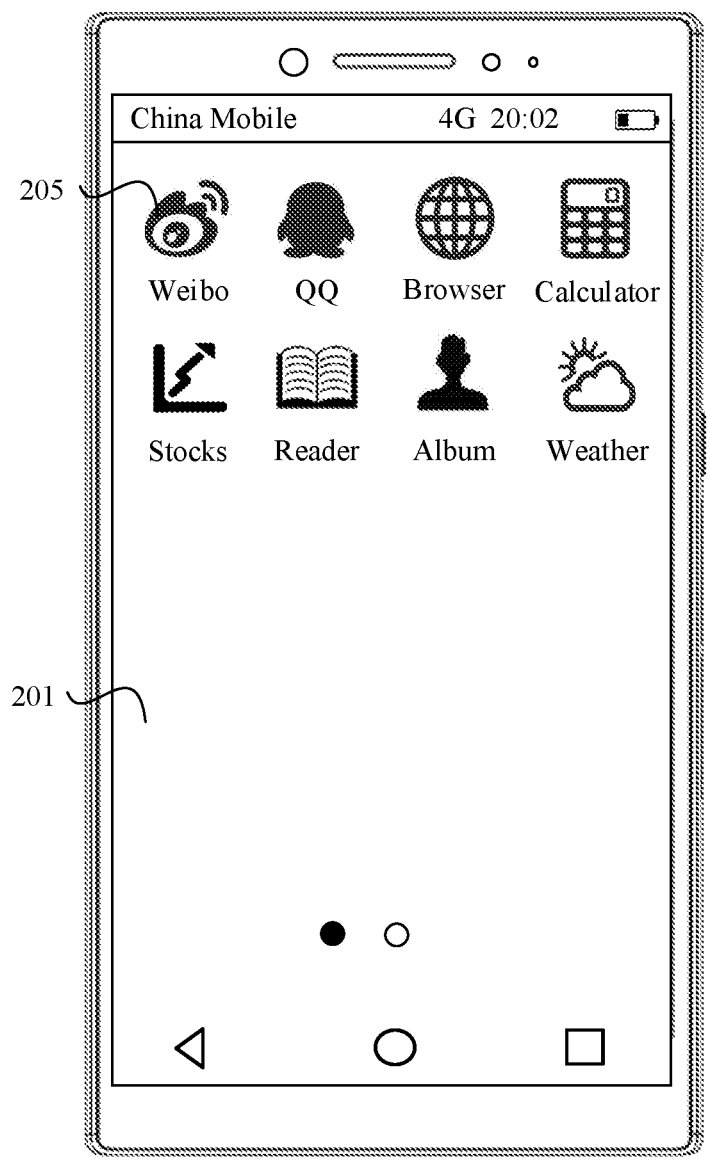
FIG. 2(a) and FIG. 2(b) are a schematic diagram 1 of a display scenario when an application is exited according to an embodiment of this application.
Figure 2B:
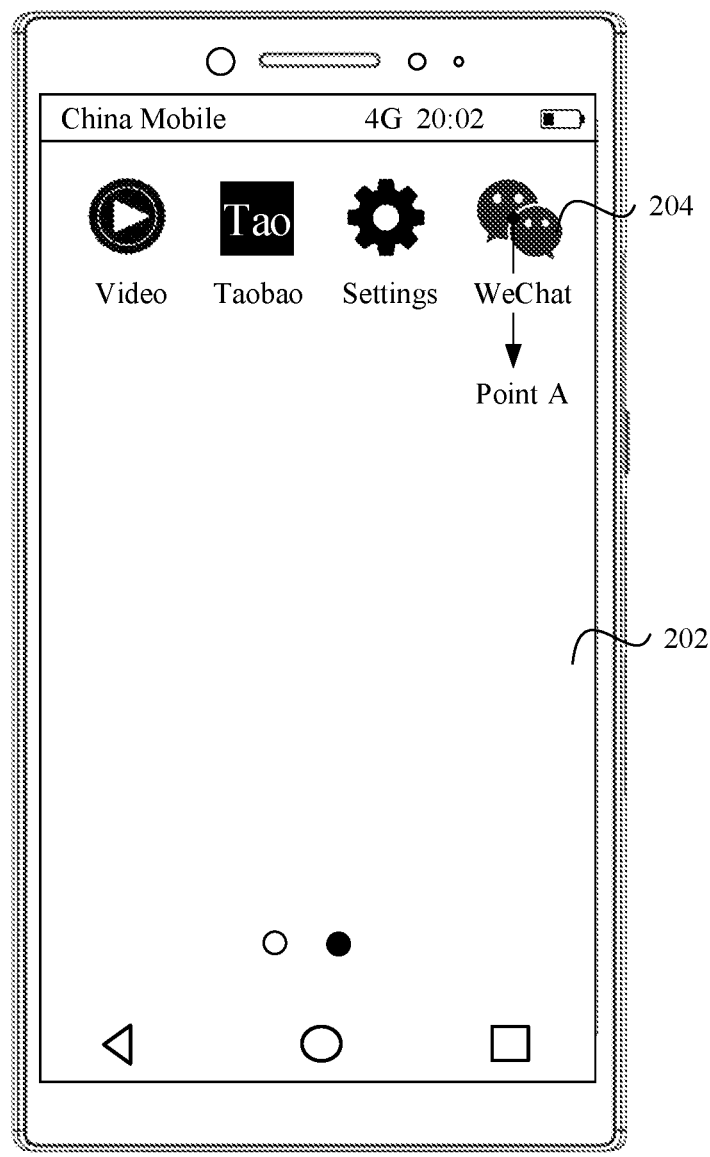

In the embodiments of this application, the home screen may be divided into a plurality of display screens, and each display screen may also be referred to as a sub-screen of the home screen. For example, as shown in FIG. 2, the home screen of the terminal may include a first display screen 201 and a second display screen 202. The first display screen 201 and the second display screen 202 each display one or more application icons. A Weibo application 205 is used as an example, and the first display screen 201 may be referred to as a display screen on which the Weibo application 205 is located. Similarly, a WECHAT® application 204 is used as an example, and the second display screen 202 may be referred to as a display screen on which the WECHAT® application 204 is located.

Generally, the user may tap an icon on the home screen to enter an application screen of a related application. When the terminal detects that the user taps an icon of an application on the home screen, the terminal may further record a specific location of the icon on the home screen on which the icon is located. For example, an icon of the WECHAT® application 204 on the home screen is specifically located at a point A on the second display screen 202. In this case, when detecting that the user performs an operation for exiting the WECHAT® application 204, the terminal may gradually scale down an application screen of the WECHAT® application 204 by using the point A as a center until the application screen of the WECHAT® application 204 disappears from the second display screen 202, and display the icon of the WECHAT® application 204, to implement a display effect of dynamically locating an application location when an application is exited.

However, an entrance that allows the user to open an application on the terminal usually does not include only an icon of the application on the home screen.

Figure 3A:
FIG. 3(a) to FIG. 3(c) are a schematic diagram 2 of a display scenario when an application is exited according to an embodiment of this application.

For example, as shown in FIG. 3(a), the terminal may display an icon or a link of an application on HIBOARD® 301. The user may alternatively tap an icon of an application on the HIBOARD® 301 to enter an application screen corresponding to the application. The HIBOARD® 301 may be a screen displayed after the user swipes an initial display screen (for example, the first display screen 201) of the home screen rightward, and reminders such as a commonly used function and application, a subscribed service, and subscribed information of the user may be displayed on the screen. A HIBOARD® menu may alternatively be referred to as a home screen assistant, a shortcut menu, or the like.

For another example, still as shown in FIG. 3(a), when the user enters a keyword into a search bar 302, the terminal may alternatively present an icon or a link of an application related to the keyword to the user as a search result. The user may also tap an icon or a link of an application in the search result to enter an application screen corresponding to the application.

Figure 3B:
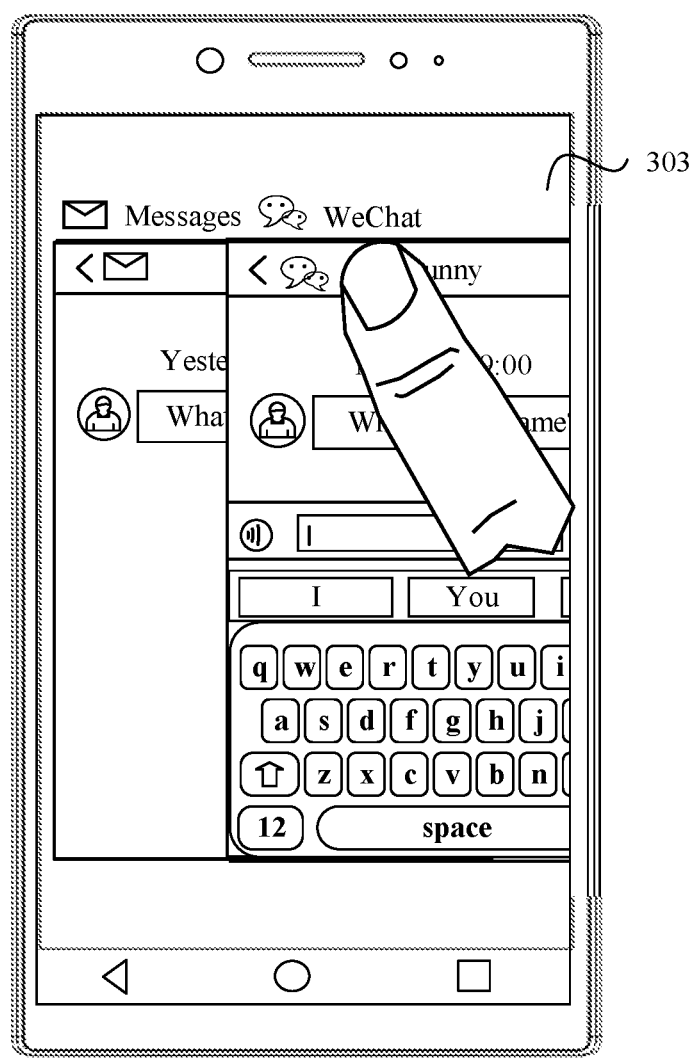

For another example, as shown in FIG. 3(b), when the terminal enters a multi-task management screen 303, the user may alternatively select, on the multi-task management screen 303, a screen corresponding to an application that is being run, so that the terminal enters an application screen of the corresponding application in response to the operation of the user.

Figure 3C:

For another example, as shown in FIG. 3(c), the terminal may alternatively display a currently unread message on a lock screen 304 (or a pull-down menu). When detecting that the user selects an unread message, the terminal may enter an application screen to which the unread message belongs.

For ease of description, in the embodiments of this application, an entrance, other than the home screen, for opening an application is referred to as a target entrance. A specific display form of the target entrance is not limited in this application. For example, the user may tap a link in an application A to go to an application B. In this case, the application A may be used as a target entrance of the application B.

Therefore, in the embodiments of this application, after the user opens an application by using the target entrance, the terminal may display an application screen of the application. Subsequently, if the terminal detects that the user performs an operation for exiting the application, the terminal may determine a home screen on which an icon of the application is located, and even determine a specific location of the icon of the application on the home screen. After exiting the application, the terminal may display the home screen (for example, a display screen on which the icon is located) on which the icon of the application is located, to guide the user to quickly and accurately locate the application. In this way, regardless of whether the user opens an application from the home screen or by using the target entrance, when the user exits the application, the terminal can implement a display effect of dynamically locating the application location when exiting the application.

The following describes implementations of the embodiments of this application in detail with reference to the accompanying drawings.

It should be noted that a display method when an application is exited provided in the embodiments of this application may be applied to a terminal. For example, the terminal may be a device such as a tablet computer, a desktop computer, a laptop computer, a notebook computer, an ultra-mobile personal computer (UMPC), a handheld computer, a netbook, a personal digital assistant (PDA), a wearable electronic device, or a smartwatch, or may be a mobile phone 100 shown in FIG. 4. A specific form of the terminal is not specially limited in the embodiments of this application.

Figure 4:
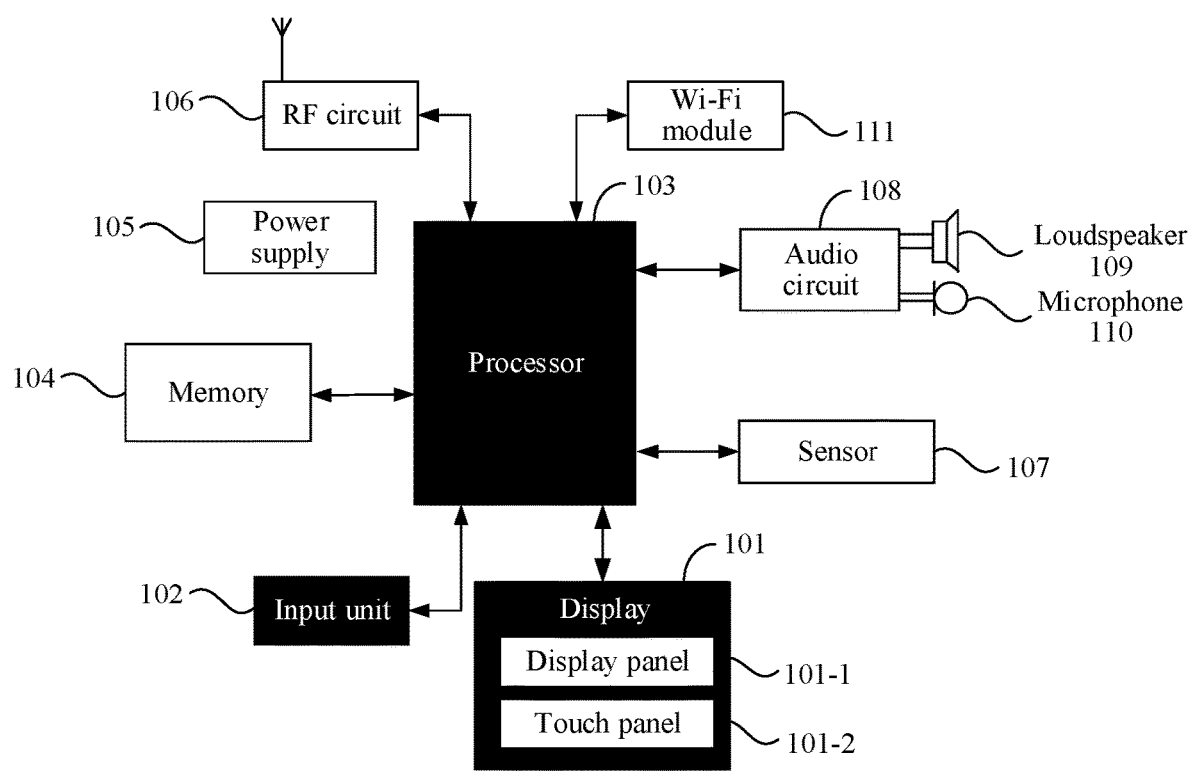
FIG. 4 is a schematic structural diagram 1 of a terminal according to an embodiment of this application.

As shown in FIG. 4, the terminal in the embodiments of this application may be a mobile phone 100. FIG. 4 is a schematic diagram of a hardware structure of the mobile phone 100. It should be understood that the mobile phone 100 shown in the figure is merely an example of the terminal. In addition, the mobile phone 100 may have more or fewer components than those shown in the figure, two or more components shown in the figure may be combined, or different component arrangements may be used.

As shown in FIG. 4, the mobile phone 100 may include components such as a display 101, an input unit 102, a processor 103, a memory 104, a power supply 105, a radio frequency (RF) circuit 106, a sensor 107, an audio circuit 108, a loudspeaker 109, a microphone 110, and a wireless fidelity (WiFi) module 111. These components may be connected (for example, these components are connected by using a bus), or may be directly connected.

The display 101 may be configured to display information entered by a user or information provided for the user, and various menus of the mobile phone 100, and may further receive a user input operation. Specifically, the display 101 may include a display panel 101-1 and a touch panel 101-2.

The display panel 101-1 may be configured in a form of a liquid crystal display (LCD), an organic light-emitting diode (OLED), or the like.

The touch panel 101-2, or referred to as a touchscreen, a touch-sensitive screen, a touch control screen, or the like, may collect a touch or non-touch operation (for example, an operation performed by the user on or near the touch panel 101-2 by using any proper object or accessory such as a finger or a stylus, or a motion sensing operation, where the operation includes a single-point control operation, a multi-point control operation, and other types of operations) performed by the user on or near the touch panel 101-2, and drive a corresponding connection apparatus according to a preset program. Optionally, the touch panel 101-2 may include two parts: a touch detection apparatus and a touch controller. The touch detection apparatus detects a touch orientation and a gesture of the user, detects a signal brought by a touch operation, and sends the signal to the touch controller. The touch controller receives a touch signal from the touch detection apparatus, converts the received touch signal into information that can be processed by the processor 103, and then sends the information to the processor 103, and can receive and execute a command sent by the processor 103. In addition, the touch panel 101-2 may be implemented by using a plurality of types such as a resistive type, a capacitive type, an infrared type, and a surface acoustic wave type, or the touch panel 101-2 may be implemented by using any technology to be developed in the future. This is not limited in the embodiments of this application.

Further, the touch panel 101-2 may cover the display panel 101-1. The user may perform, based on content displayed on the display panel 101-1 (the displayed content includes but is not limited to any one or any combination of the following: a soft keyboard, a virtual mouse, a virtual key, an icon, and the like), an operation on or near the touch panel 101-2 that covers the display panel 101-1. After detecting the operation performed on or near the touch panel 101-2, the touch panel 101-2 transfers the operation to the processor 103 by using an input/output subsystem, to determine a user input. Then, the processor 103 provides a corresponding visual output on the display panel 101-1 based on the user input by using the input/output subsystem. Although in FIG. 4, the touch panel 101-2 and the display panel 101-1 are used as two independent components to implement input and output functions of the mobile phone 100, in some embodiments, the touch panel 101-2 and the display panel 101-1 may be integrated to implement the input and output functions of the mobile phone 100.

The input unit 102 may be the touch panel 101-2, or may be another input device. The another input device may be configured to receive input digital or character information, and generate a key signal input related to user setting and function control of the mobile phone 100. Specifically, the another input device may include any one or a combination of the following: a physical keyboard, a function key (such as a volume control key or a switch key), a trackball, a mouse, a joystick, and an optical mouse (the optical mouse is an extension of a touch-sensitive surface that does not display a visual output or an extension of a touch-sensitive surface formed by a touchscreen). The another input device is connected to another input device controller of the input/output subsystem, and exchange signals with the processor 103 under control of the another input device controller.

The processor 103 is a control center of the mobile phone 100, is connected to all parts of the entire mobile phone 100 by using various interfaces and cables, and executes various functions of the mobile phone 100 and performs data processing by running or executing a software program and/or a module stored in the memory 104 and by invoking data stored in the memory 104, to perform overall monitoring on the mobile phone 100. Optionally, the processor 103 may include one or more processing units, and the processor 103 may integrate an application processor and a modem processor. The application processor mainly processes an operating system, a user interface, an application, and the like, and the modem processor mainly processes wireless communication. It may be understood that the modem processor and the application processor may be alternatively disposed separately. The processor may be a modem, or may be an application processor, or may be a modem and an application processor.

The memory 104 may be configured to store data, a software program, and a module. The processor 103 executes various function applications of the mobile phone 100 and processes data by running the data, the software program, and the module stored in the memory 104, for example, perform the method for recognizing a screenshot text provided in the embodiments of this application. The memory 104 may mainly include a program storage area and a data storage area. The program storage area may store an operating system, an application needed by at least one function (for example, a sound playing function and an image playing function), and the like. The data storage area may store data (for example, audio data and an address book) and the like created based on use of the mobile phone 100. In addition, the memory 104 may be a volatile memory, for example, a random-access memory (RAM) or a high-speed random access memory; or may be a non-volatile memory, for example, a magnetic disk storage device, a flash memory device, a read-only memory (ROM), a flash memory, a hard disk drive (HDD), or a solid-state drive (SSD); or may be a combination of the foregoing types of memories.

The power supply 105 may be a battery, and is logically connected to the processor 103 by using a power supply management system, to implement functions such as charging management, discharging management, and power consumption management by using the power supply management system.

The RF circuit 106 may be configured to receive and send information, or receive and send a signal during a call. In particular, the RF circuit 106 sends received downlink information of a base station to the processor 103 for processing, and sends related uplink data to the base station. Usually, the RF circuit 106 includes, but is not limited to, an antenna, at least one amplifier, a transceiver, a coupler, a low noise amplifier (LNA), a duplexer, and the like. In addition, the RF circuit 106 may further communicate with a network and another device through wireless communication. In the wireless communication, any communications standard or protocol may be used, including one or a combination of a plurality of the following: a global system for mobile communications (GSM), a general packet radio service (GPRS), code division multiple access (CDMA), wideband code division multiple access (WCDMA), long term evolution (LTE), an email, a short messaging service ( ) and the like.

The mobile phone 100 may further include at least one sensor 107, such as an optical sensor, a speed sensor, a global positioning system (GPS) sensor, and another sensor. Specifically, the light sensor may include an ambient light sensor and a proximity sensor. The ambient light sensor may adjust luminance of the display panel 101-1 based on brightness of ambient light. The proximity sensor may power off the display panel 101-1 and/or backlight when the mobile phone 100 approaches an ear. As a type of the speed sensor, an accelerometer sensor may detect magnitudes of accelerations of the mobile phone 100 in various directions (generally three axes), may detect a magnitude and a direction of gravity when the mobile phone 100 is stationary, and may be applied to an application (for example, horizontal and vertical screen switch, related games, and magnetometer posture calibration) for recognizing gestures of the mobile phone 100, vibration recognition related functions (such as a pedometer and a knock), and the like. Other sensors such as a gyroscope, a barometer, a hygrometer, a thermometer, an infrared sensor, and a pressure sensor may be further configured on the mobile phone 100. Details are not described herein.

The audio circuit 108, the loudspeaker 109, and the microphone 110 may provide an audio interface between the user and the mobile phone 100. The audio circuit 108 may transmit, to the loudspeaker 109, an electrical signal converted from received audio data, and the loudspeaker 109 converts the electrical signal into a sound signal for outputting. In addition, the microphone 110 converts a collected sound signal into an electrical signal. The audio circuit 108 receives the electrical signal, converts the electrical signal into audio data, and then outputs the audio data to the RF circuit 106, to send the audio data to, for example, another mobile phone, or outputs the audio data to the processor 103 for further processing.

The Wi-Fi module 111 may be a module including a Wi-Fi chip and a Wi-Fi chip driver, and the Wi-Fi chip is capable of running a wireless Internet standard protocol.

Although not shown, the mobile phone 100 may further include components such as a Bluetooth module and a camera. This is not limited in the embodiments of this application. The Bluetooth module is a printed circuit board assembly (PCBA) having a Bluetooth function, and is configured for short-range wireless communication.

In the embodiments of this application, the processor 103 may be an application processor, and the processor 103 may open or exit an application in response to an operation input by the user into the input unit 102. In this case, when detecting that the user performs an operation for opening an application into the input unit 102 by using the target entrance, the processor 103 may open the application. Correspondingly, when detecting that the user performs an operation for exiting the application into the input unit 102, because a location of an icon of each application on the terminal is fixed on a home screen in a time period, when an application is exited, the processor 103 may determine a specific location of an icon of the application on the home screen based on information such as information (for example, a package name (packname)) about the application. For example, an icon of a WECHAT® application is located on a second display screen 202 of the home screen. Further, after exiting an application screen of the WECHAT® application, the processor 103 may instruct the display 101 to automatically switch to the second display screen 202 on which the icon of the WECHAT® application is located, so that an application location can be located when an application is exited.

In addition, a display process of the display 101 is a high-speed frame drawing process. For example, the display 101 may perform frame drawing at a frequency of 60 Hz. Therefore, there are usually a plurality of frames of images in a display process of the display 101 from exiting the application screen of the WECHAT® application to switching to the second display screen 202. In this case, the processor 103 may further instruct the display 101 to add, to the plurality of frames of images, an animation special effect of dramatically exiting the WECHAT® application and displaying the second display screen 202, so that the mobile phone 100 can quickly and efficiently guide the user to locate an application when exiting the application.

Figure 5A:
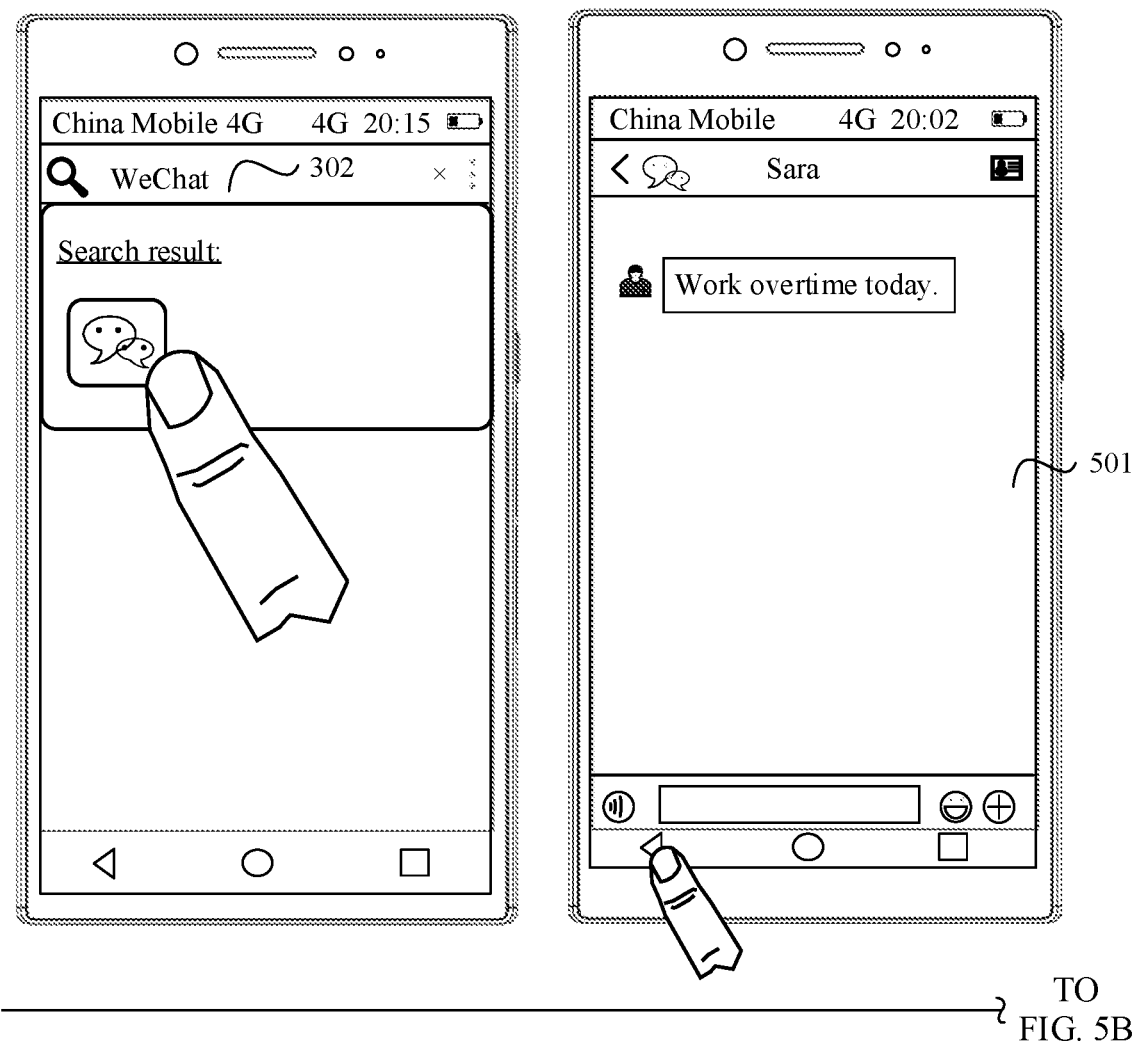
FIG. 5A to FIG. 5C are a schematic diagram 3 of a display scenario when an application is exited according to an embodiment of this application.
Figure 5B:
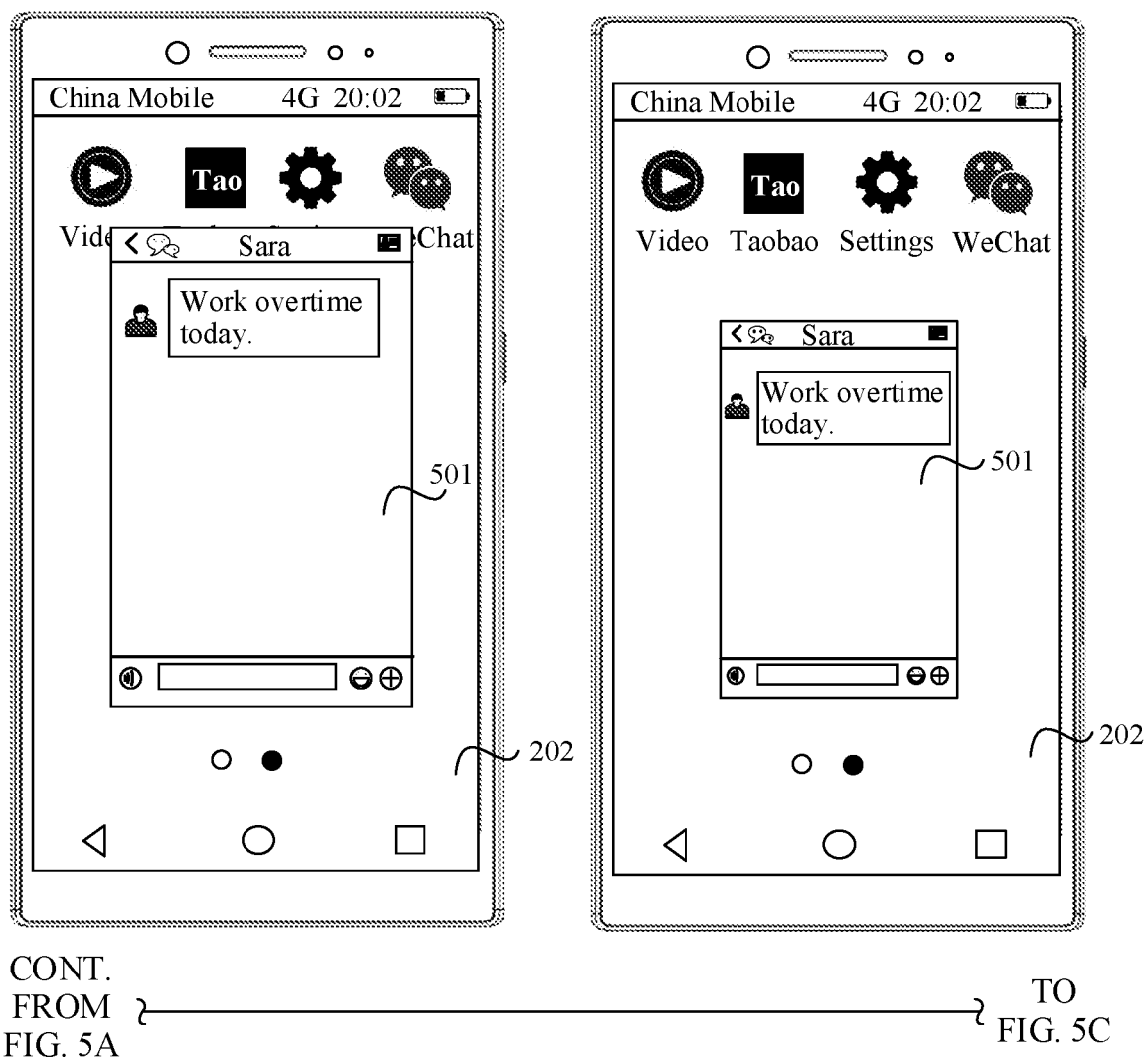
Figure 5C:
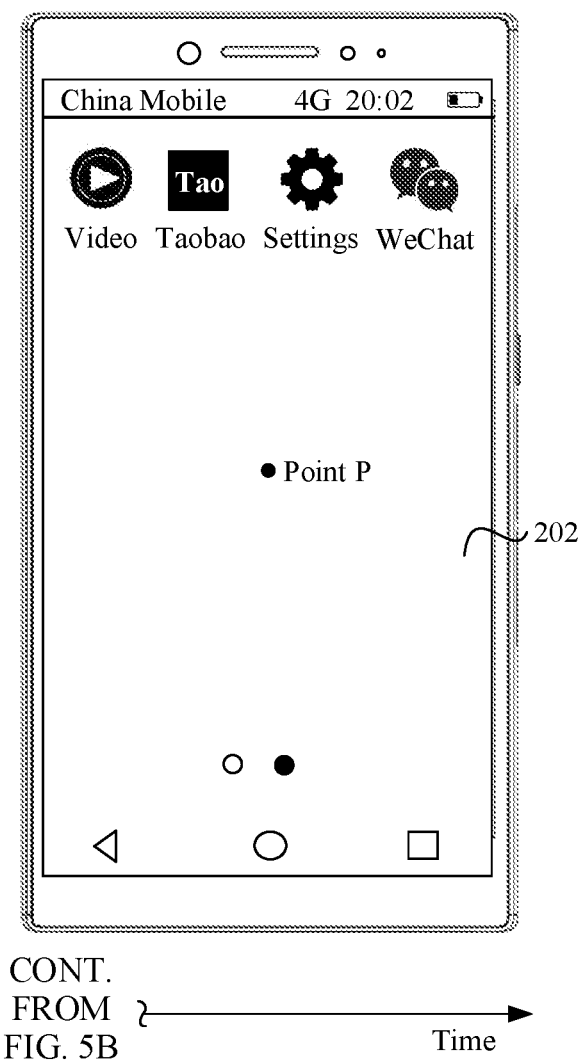

For example, as shown in FIG. 5A to FIG. 5C, the user opens the WECHAT® application by using a target entrance such as the search bar 302. When detecting that the user taps a back button to exit the WECHAT® application, the processor 103 may instruct the display 101 to display, as a background, the second display screen 202 on which the icon of the WECHAT® application is located. In addition, the processor 103 may instruct the display 101 to use a center point P of the second display screen 202 as a scale center, and to gradually scale down, during drawing of each frame of image, an application screen 501 displayed when the WECHAT® application is exited, until the application screen 501 disappears from the second display screen 202.

Figure 6A:
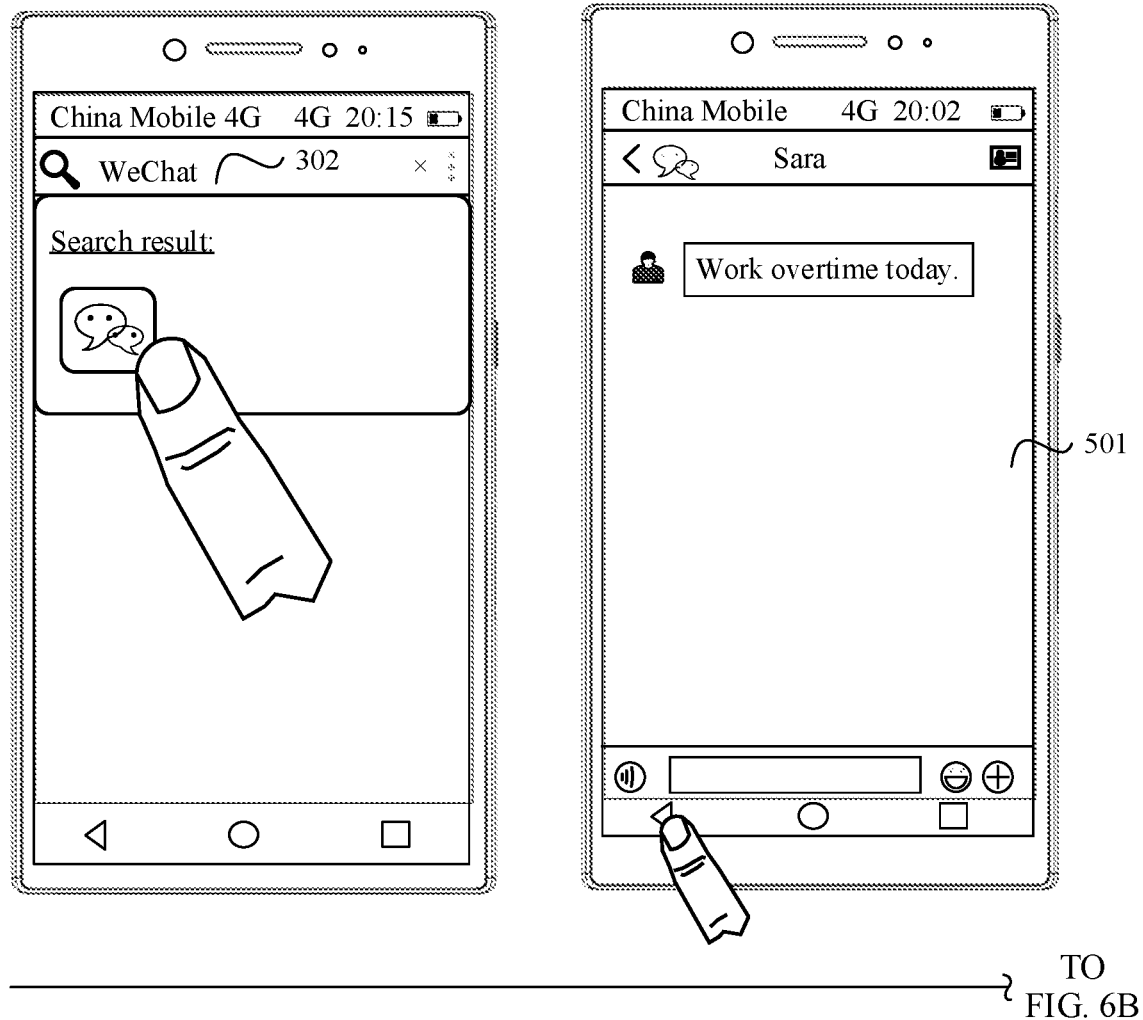
FIG. 6A to FIG. 6C are a schematic diagram 4 of a display scenario when an application is exited according to an embodiment of this application.
Figure 6B:
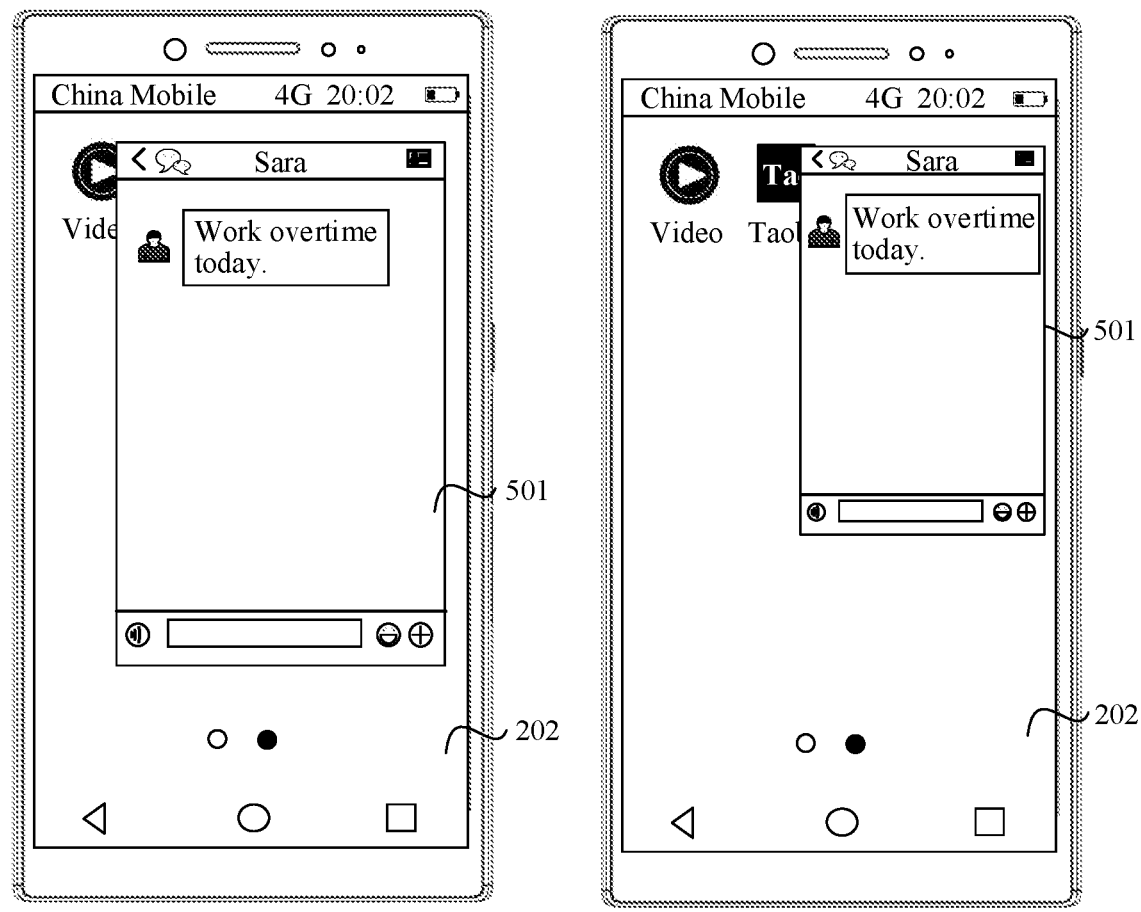
Figure 6C:
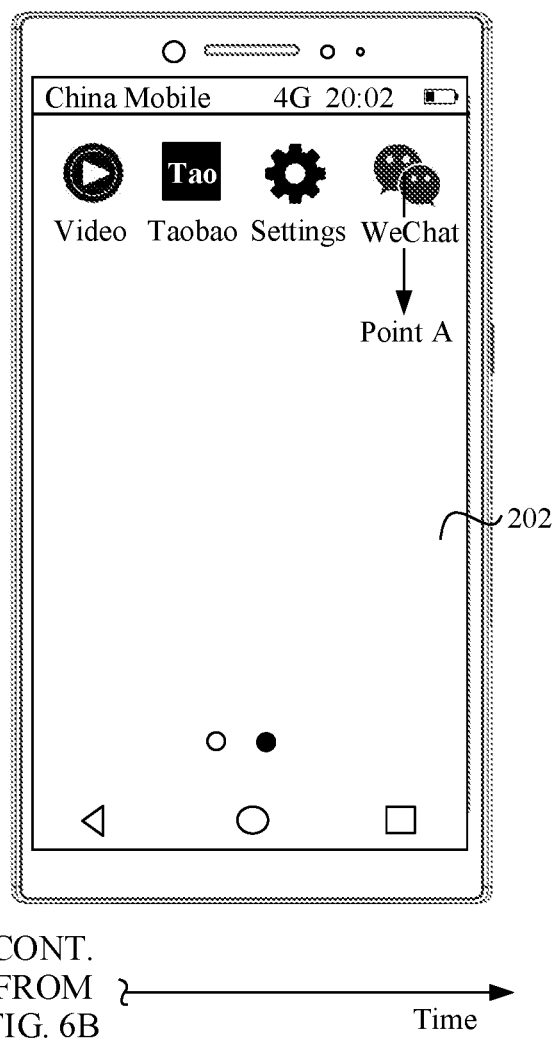

Alternatively, for example, the user opens the WECHAT® application still by using the target entrance such as the search bar. As shown in FIG. 6A to FIG. 6C, in a drawing process corresponding to exiting the WECHAT® application and displaying the second display screen 202, the processor 103 may instruct the display 101 to display, as a background, the second display screen 202 on which the icon of the WECHAT® application is located. In addition, the processor 103 may instruct the display 101 to use a location of the icon of the WECHAT® application (for example, a point A in FIG. 6C) on the second display screen 202 as a scale center, to gradually scale down, during drawing of each frame of image, an application screen 501 displayed when the WECHAT® application is exited, until the application screen 501 disappears from the second display screen 202, and to display the icon of the WECHAT® application. This display effect of dynamically exiting an application not only helps the user locate a home screen on which the application is located, but also helps the user accurately locate a specific location of the application on the home screen.

For example, the memory 104 on the mobile phone 100 may store an ANDROID® operating system. The operating system is a Linux-based mobile device operating system, and implements various functions together with the foregoing hardware on the mobile phone 100. The following describes a software architecture of the stored ANDROID® operating system in detail. It should be noted that, in the embodiments of this application, the ANDROID® operating system is merely an example to describe a software environment needed by a terminal to implement the technical solutions in the embodiments. A person skilled in the art may understand that the embodiments of this application may also be implemented by using another operating system, for example, a mobile operating system developed by Apple.

Figure 7:
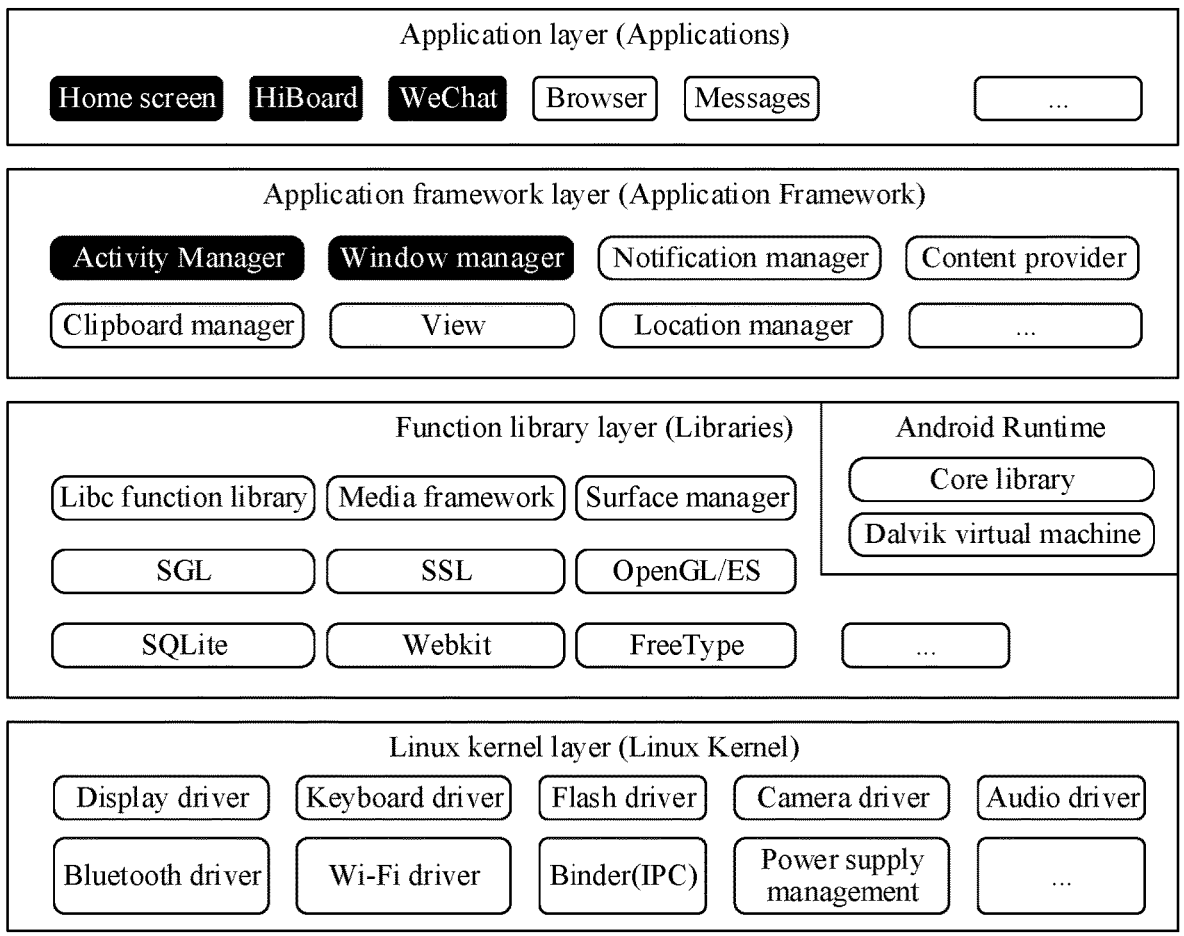
FIG. 7 is a schematic diagram of an Android operating system architecture according to an embodiment of this application.

For example, FIG. 7 is a schematic diagram of a software architecture of an ANDROID® operating system that can be run on the foregoing terminal. The software architecture may be divided into four layers: an application layer, an application framework layer, a function library layer, and a Linux kernel layer.

1. Application Layer

The application layer is an uppermost layer of the operating system, and includes native applications in the operating system, such as a home screen, HIBOARD®, an email client, Messages, Phone, Calendar, Browser, and Contacts. Certainly, a developer may compile an application and install the application at the layer. The application is usually developed by using a Java language, and the development is completed by invoking an application programming interface (API) provided by the application framework layer.

2. Application Framework Layer

The application framework layer mainly provides a developer with various APIs that can be used to access applications. The developer may interact with a lower layer (for example, the function library layer or the Linux kernel layer) of the operating system by using the application framework layer, to develop an application of the developer. The application framework layer mainly includes a series of services and management systems of the Android operating system. The application framework layer mainly includes the following basic services:

An activity manager manages a lifecycle of each application. The application usually is run in the operating system in a form of an activity. For each activity, there is a corresponding application record (ActivityRecord) in the activity manager, and the ActivityRecord records a status of the activity of the application. The activity manager may use the ActivityRecord as an identifier to schedule an activity process of the application.

A window manager (WindowManagerService) is configured to manage a graphical user interface (GUI) resource used on a screen, and may be specifically configured to create and delete a window, display and hide a window, arrange a window, manage a focus, manage an input method and wallpaper, and the like.

In the embodiments of this application, a user may use an application icon on a home screen as an entrance for opening an application, or the user may open an application screen of the application by using a target entrance (for example, HIBOARD® or a pull-down menu) other than the application icon on the home screen. A WECHAT® application is used as an example. When the terminal opens the WECHAT® application, the WECHAT® application may be used as an activity to create a process of the WECHAT® application. The process of the WECHAT® application may register an activity record of the WECHAT® application with the activity manager.

When the WECHAT® application is exited, the activity manager may transfer a package name of the WECHAT® application to a home screen process at the application layer based on the activity record of the WECHAT® application. Because related data such as a location and an icon of each application on the home screen is maintained in the home screen process, the home screen process may determine a specific location of an icon of the WECHAT® application on the home screen based on the package name of the WECHAT® application. For example, the icon of the WECHAT® application on the home screen is specifically located on a second display screen 202 of the home screen, or the icon of the WECHAT® application on the home screen is specifically located at a point A on the second display screen 202 of the home screen.

Subsequently, the home screen process may transfer information about the icon of the WECHAT® application on the home screen, for example, location information, to the window manager. In this case, the window manager may present, based on the specific location of the icon of the WECHAT® application on the home screen, a dynamic display effect of exiting the WECHAT® application and returning to a corresponding display screen of the home screen.

Certainly, the application framework layer may further include a service and management system such as a content provider, a notification manager, a clipboard manager, a view, and a location manager.

3. Function Library Layer

The function library layer is a support of the application framework layer, and is an important link that connects the application framework layer and the Linux kernel layer. The function library layer includes some function libraries compiled by using a computer programming language C or C++. These function libraries can be used by different components in the operating system, and provide services for a developer by using the application framework layer. Specifically, the function libraries may include a libc function library, and the libc function library is specially customized for an embedded-Linux-based device. The function libraries may further include a multimedia library, and the library supports playback and recording of audio or videos in a plurality of encoding formats, and further supports a still image file and a common audio or video encoding format. The function libraries further include a surface manager library. The surface manager library is mainly responsible for managing access to a display system, is specifically responsible for managing interaction between a display and an access operation when a plurality of applications are executed, and is further responsible for display composition of 2D drawing and 3D drawing.

The function library layer may further include other function libraries used to implement functions of a mobile phone, such as an SGL (Scalable Graphics Library) that is an XML (Extensible Markup Language) file-based 2D graph and image processing engine, an SSL (Secure Sockets Layer) that is located between a TVP/IP protocol and various application layer protocols to provide a support for data communication, an OpenGL/ES that supports a 3D effect, SQLite that is a relational database engine, Webkit that is a web browser engine, and FreeType that supports a bitmap and a vector font.

Android Runtime is a running environment on the ANDROID® operating system, and is a new virtual machine used in the ANDROID® operating system. An AOT (Ahead-Of-Time) technology is used in the Android Runtime. When an application is installed for the first time, a bytecode of the application is precompiled into a machine code, so that the application becomes a real local application. Then, a compilation operation is omitted when the application is run again, so that both starting and execution of the application become faster.

In some other embodiments of this application, the Android Runtime may alternatively be replaced with a core function library (Core Libraries) and a Dalvik virtual machine. The core function library provides most functions of an API in the Java language, and mainly provides, for the application framework layer in a Java Native Interface (JNI) manner, an interface for invoking a bottom-layer program library. In addition, the core function library further includes some core APIs of the operating system, such as android.os, android.net, and android.media. The Dalvik virtual machine uses a JIT (Just-in-Time) runtime compilation mechanism. Each time a process is started, the virtual machine needs to recompile a bytecode in the background, affecting a startup speed. Each application is run in one Dalvik virtual machine instance, and each Dalvik virtual machine instance is independent process space. The Dalvik virtual machine is designed to enable a plurality of virtual machines to run in one device efficiently. The Dalvik virtual machine may execute a file format.dex. The dex format is a compression format specially designed for Dalvik, and is suitable for a system having limited memory and a limited processor speed. It should be noted that, the Dalvik virtual machine depends on the Linux kernel to provide a basic function (thread management and bottom-layer memory management). It may be understood that the Android Runtime and the Dalvik are different types of virtual machines, and a person skilled in the art may select different forms of virtual machines in different cases.

4. Linux Kernel Layer

The layer provides a core system service of the operating system. For example, security, memory management, process management, a network protocol stack, and a driver model are all based on the Linux kernel. The Linux kernel is also used as an abstraction layer between hardware and a software stack. The layer has many drivers related to a mobile device, and includes the following main drivers: a display driver, a Linux-based frame buffer driver, a keyboard driver that is used as an input device, a flash driver that is based on a memory technology device, a camera driver, an audio driver, a Bluetooth driver, a Wi-Fi driver, and the like.

For ease of understanding, the following specifically describes, with reference to the accompanying drawings, the display method when an application is exited according to the embodiments of this application.

Figure 8:
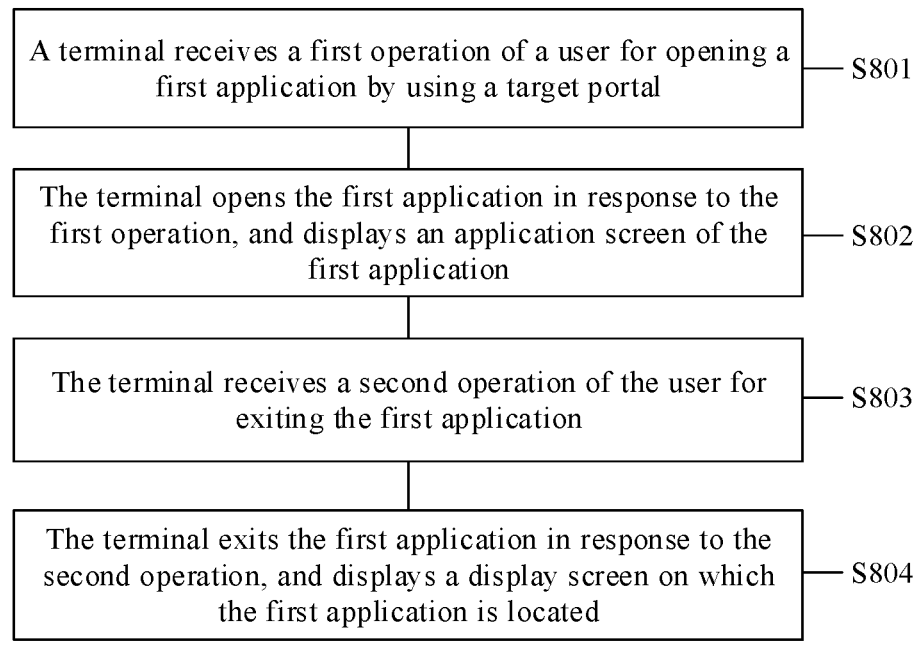
FIG. 8 is a flowchart 1 of a display method when an application is exited according to an embodiment of this application.

FIG. 8 is a flowchart of a display method when an application is exited according to an embodiment of this application. As shown in FIG. 8, the display method when the application is exited may include the following operations.

S801: A terminal receives a first operation of a user for opening a first application by using a target entrance.

Figure 9A:
FIG. 9(a) to FIG. 9(c) are a schematic diagram 5 of a display scenario when an application is exited according to an embodiment of this application.
Figure 9B:
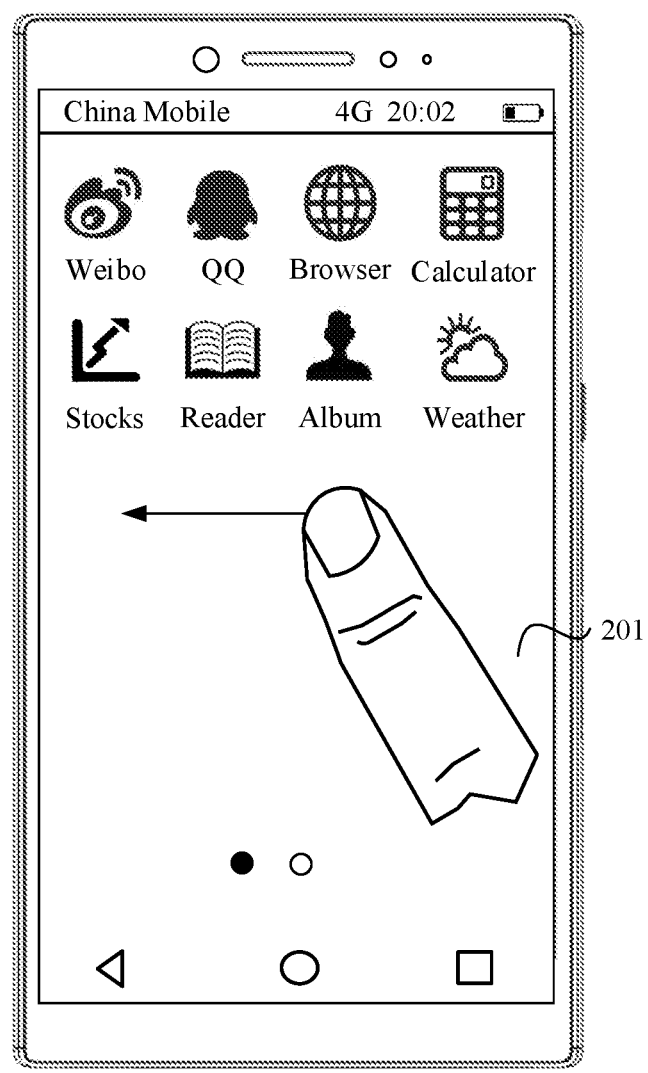
Figure 9C:
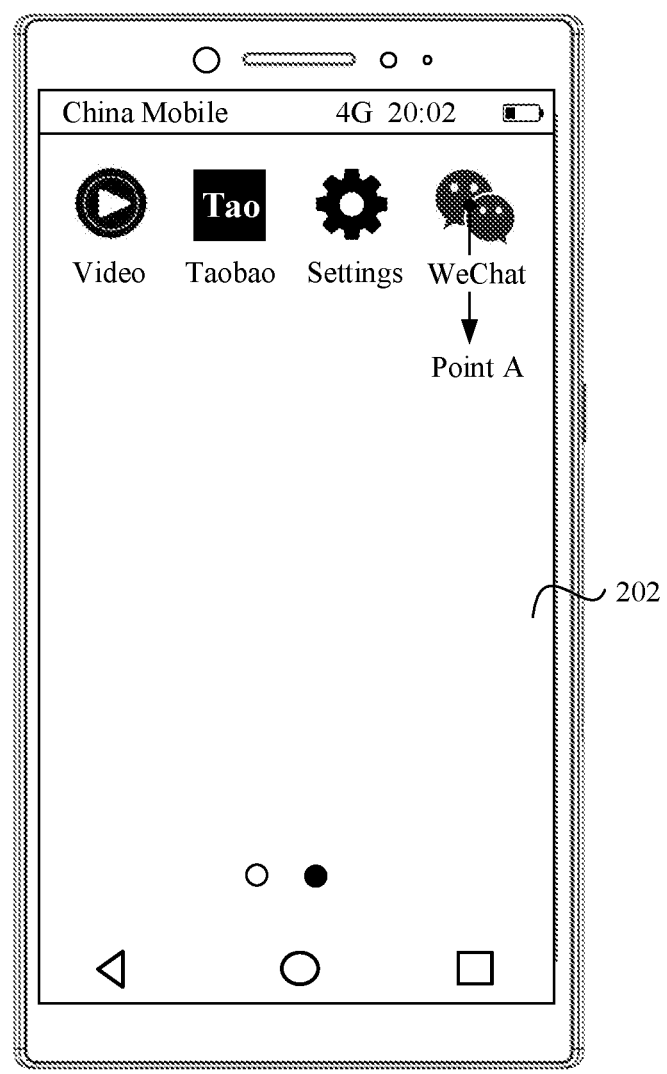

For example, as shown in FIG. 9(a), the terminal displays HIBOARD® 301 in this case. The HIBOARD® 301 may include an icon or a link of at least one application. The icon or link may be manually added by the user, or may be automatically recommended by the terminal to the user based on a use habit of the user. In addition, a search bar 302 may also be set on the HIBOARD® 301. The user may enter a keyword into the search bar 302, to trigger the terminal to search for a search result related to the keyword and display the search result to the user in a form of an icon, a link, or the like of an application. Certainly, the search bar 302 may alternatively be set on a home screen, a pull-up menu, or a pull-down menu. This is not limited in this embodiment of this application. As shown in FIG. 9(b), a screen displayed after the user swipes the HIBOARD® 301 leftward is a first display screen 201 of the home screen. In other words, the first display screen 201 of the home screen is a display screen adjacent to the HIBOARD® 301. As shown in FIG. 9(c), a screen displayed after the user swipes the first display screen 201 leftward is a second display screen 202 of the home screen, and the second display screen 202 is not adjacent to the HIBOARD® 301. Certainly, the home screen may further include a display screen such as a third display screen or a fourth display screen. This is not limited in this embodiment of this application.

When the target entrance is the search result provided in the search bar 302, an icon of the first application may be located on any display screen (for example, the first display screen 201 or the second display screen 202) of the home screen.

When the target entrance is an icon or a link of an application provided on the HIBOARD® 301, the icon of the first application may be located on any display screen (for example, the second display screen 202), not adjacent to the HIBOARD® 301, of the home screen.

When the target entrance is the multi-task management screen 303, the icon of the first application is not located on a home screen on which the terminal stays before the terminal enters the multi-task management screen 303. For example, when the terminal stays on the second display screen 202, the terminal may display the multi-task management screen 303 in response to an operation of the user for entering the multi-task management screen 303. In this case, the home screen on which the terminal stays before the terminal enters the multi-task management screen 303 is the second display screen 202, and the first application is an application represented by any application icon on the first display screen 201.

When the target entrance is a notification message on a lock screen, the icon of the first application is not located on a home screen on which the terminal stays before screen lock. For example, when the terminal stays on the second display screen 202, the terminal may display the lock screen in response to a screen lock operation of the user. In this case, the home screen on which the terminal stays before screen lock is the second display screen 202, and the first application is an application represented by any application icon on the first display screen 201.

When the target entrance is a notification message in a pull-down menu (or a pull-up menu), the icon of the first application is not located on a home screen on which the terminal stays before the terminal enters the pull-down menu (or the pull-up menu). For example, when the terminal stays on the second display screen 202, the terminal may display the pull-down menu (or the pull-up menu) in response to a pull-up (or pull-down) operation of the user. In this case, the first application is an application represented by any application icon on the first display screen 201.

It should be noted that, if the terminal opens, when staying on the second display screen 202, an application represented by an application icon on the second display screen 202, and then the terminal enters the multi-task management screen 303 (or the lock screen, the pull-down menu, or the pull-up menu), it may also be considered that the terminal stays on the second display screen 202 before entering the multi-task management screen 303 (or the lock screen, the pull-down menu, or the pull-up menu).

Figure 10:
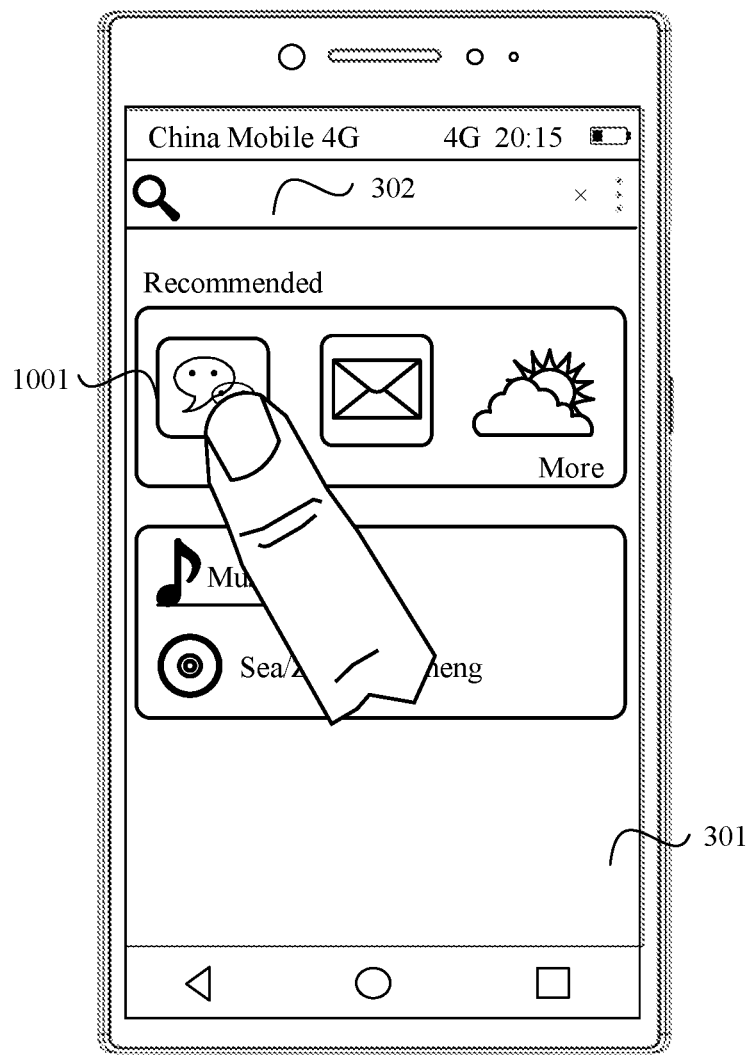
FIG. 10 is a schematic diagram 6 of a display scenario when an application is exited according to an embodiment of this application.

In other words, in operation S801, the terminal may receive the first operation of the user for opening the first application by using the various types of target entrances. The first operation may be any operation for opening the first application, such as tapping, touching and holding, or swiping. This is not limited in this embodiment of this application. In an example in which a WECHAT® application on the second display screen 202 in FIG. 9(c) is the first application. As shown in FIG. 10, the HIBOARD® 301 may also display an icon 1001 of the WECHAT® application, and the icon 1001 of the WECHAT® application is not located on the first display screen 201 adjacent to the HIBOARD® 301. In this case, if the terminal detects that the user taps the icon 1001 of the WECHAT® application on the HIBOARD® 301, the terminal may continue to perform the following operations S802 to S804.

S802: The terminal opens the first application in response to the first operation, and displays an application screen of the first application.

In operation S802, if the terminal receives the first operation of the user for opening the first application by using the target entrance, the terminal may determine whether the first application is run in the background. Generally, an application process at a stack top in an application stack of the terminal is an application that is being run in the foreground, and an application process other than the application process at the stack top is an application that is run in the background. In this case, the terminal may determine, by querying whether a process of the first application is at the stack top of the application stack, whether the first application is run in the background.

If the first application is run in the background, the terminal may switch the process of the first application to the stack top of the application stack, so that the first application is opened in the foreground. Correspondingly, if the first application is not run in the background, the terminal may create the process of the first application, and set the process of the first application as a process at the stack top, so that the first application is opened in the foreground.

Figure 11:
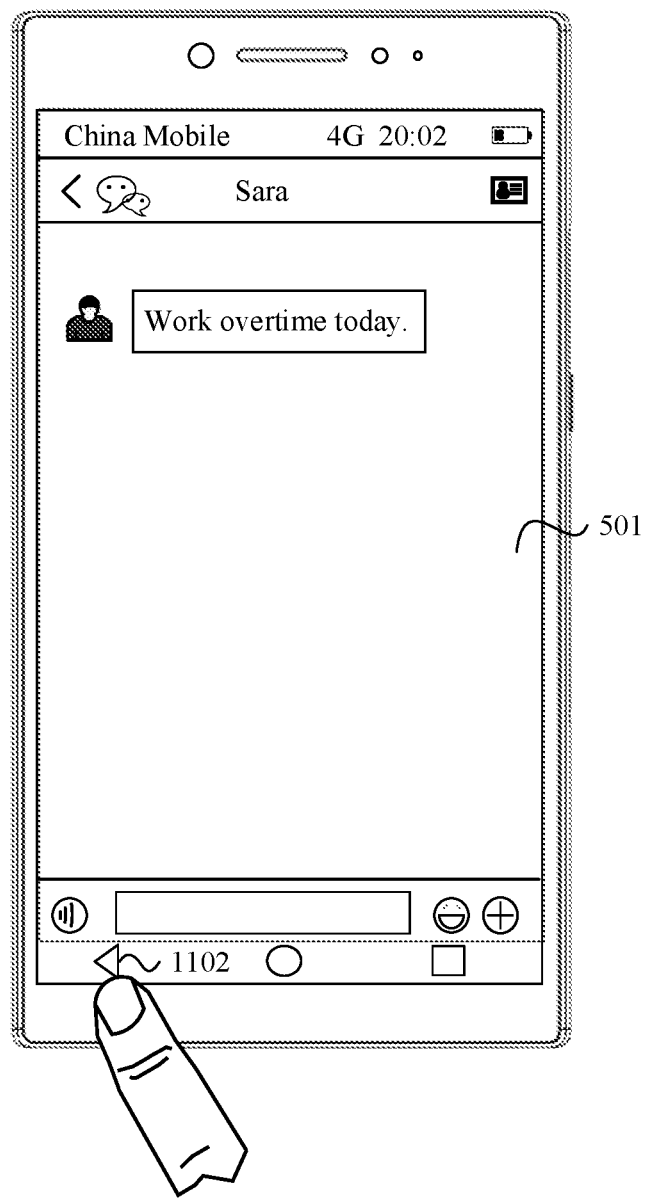
FIG. 11 is a schematic diagram 7 of a display scenario when an application is exited according to an embodiment of this application.

Still in an example in which the WECHAT® application is the first application, as shown in FIG. 11, after the WECHAT® application is opened in the foreground, the terminal may display an application screen 501 provided by the WECHAT® application. The application screen 501 may be a display screen that is output to the user when the WECHAT® application is run in the foreground. For example, the application screen 501 shown in FIG. 11 is a current chat screen between the user and Sara. Certainly, it may be understood that the application screen 501 of the WECHAT® application may alternatively be a Contacts screen, a Moments screen, a Settings screen, or the like.

It should be noted that when an application is run in the foreground, a display module (for example, a display) may present a corresponding visual output to the user. When the application is run in the background, the visual output is not provided to the user, but a process of the application is not ended.

S803: The terminal receives a second operation of the user for exiting the first application.

Exiting the first application may be switching the first application to the background of the terminal for continuing running, or may be ending the process of the first application (in other words, killing the first application).

Similar to the first operation, the second operation may be specifically any operation for exiting the first application, such as tapping a back button, pressing a home button, or pressing a power button. This is not limited in this embodiment of this application. These buttons may be physical buttons or virtual buttons.

Still in an example in which the WECHAT® application is the first application, as shown in FIG. 11, if the user wants to exit the WECHAT® application, the user may tap a back button 1102 in a navigation bar. After detecting an operation that the user taps the back button 1102, the terminal may continue to perform the following operation S804.

S804: The terminal exits the first application in response to the second operation, and displays a display screen on which the icon of the first application is located.

In operation S804, if the terminal detects that the user performs the second operation for exiting the first application, it indicates that the user no longer needs to use the first application. In this case, in the background of the terminal, the terminal may end the process of the first application or push the process of the first application into the application stack and run the first application as a background application.

Figure 12:
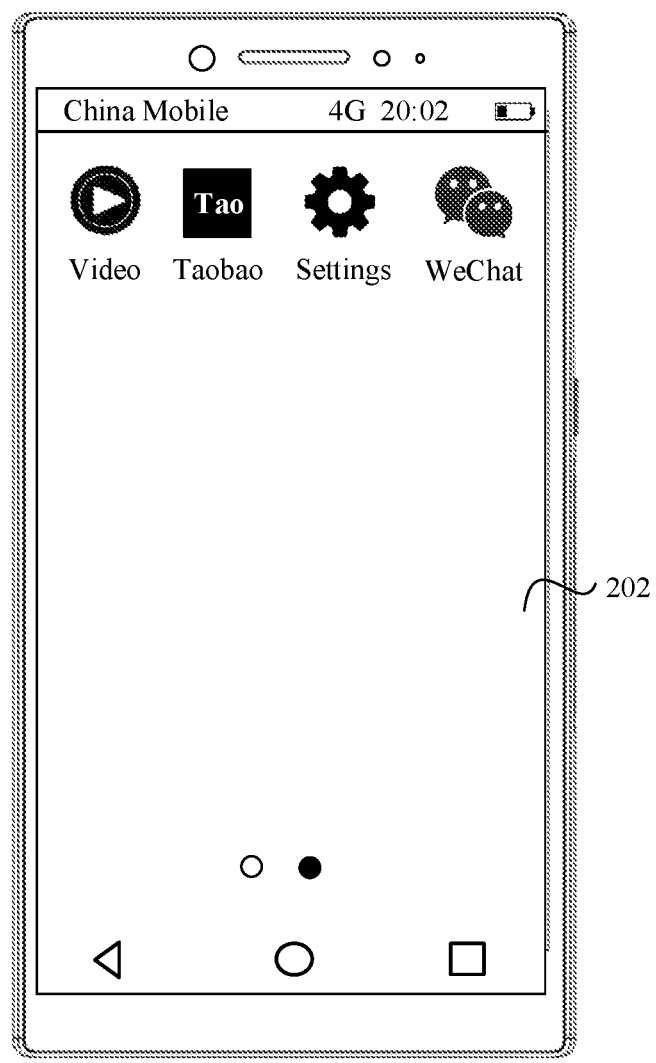
FIG. 12 is a schematic diagram 8 of a display scenario when an application is exited according to an embodiment of this application.

However, in the foreground of the terminal, to guide the user to quickly locate an application location on the home screen, the terminal may obtain specific location information of the first application on the home screen. Still in an example in which the WECHAT® application is the first application, the terminal may query, from the home screen process, that a location of the icon 1001 of the WECHAT® application on the home screen is on the second display screen 202. In this case, as shown in FIG. 12, in response to the second operation, after exiting the WECHAT® application, the terminal may return to the second display screen 202, and the icon of the WECHAT® application is located on the second display screen 202. Even if the user opens the first application by using the target entrance other than the home screen, when exiting the first application, the terminal may still return to the home screen on which the first application is located. This helps the user locate the location of the first application on the home screen after the first application is exited.

Figure 13A:
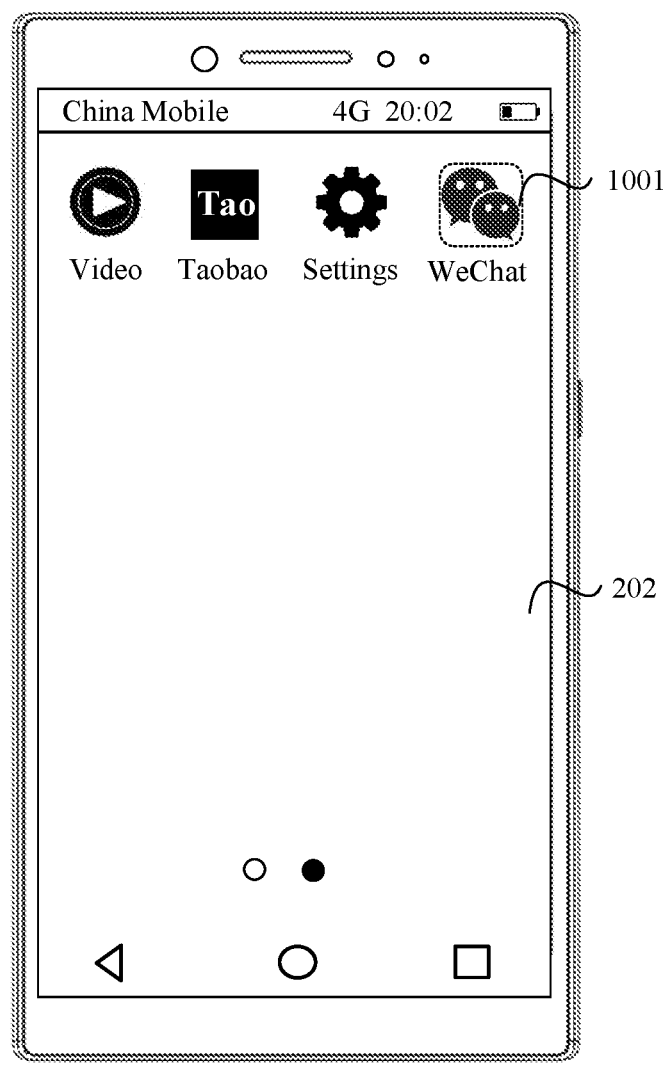
FIG. 13(a) and FIG. 13(b) are a schematic diagram 9 of a display scenario when an application is exited according to an embodiment of this application.
Figure 13B:
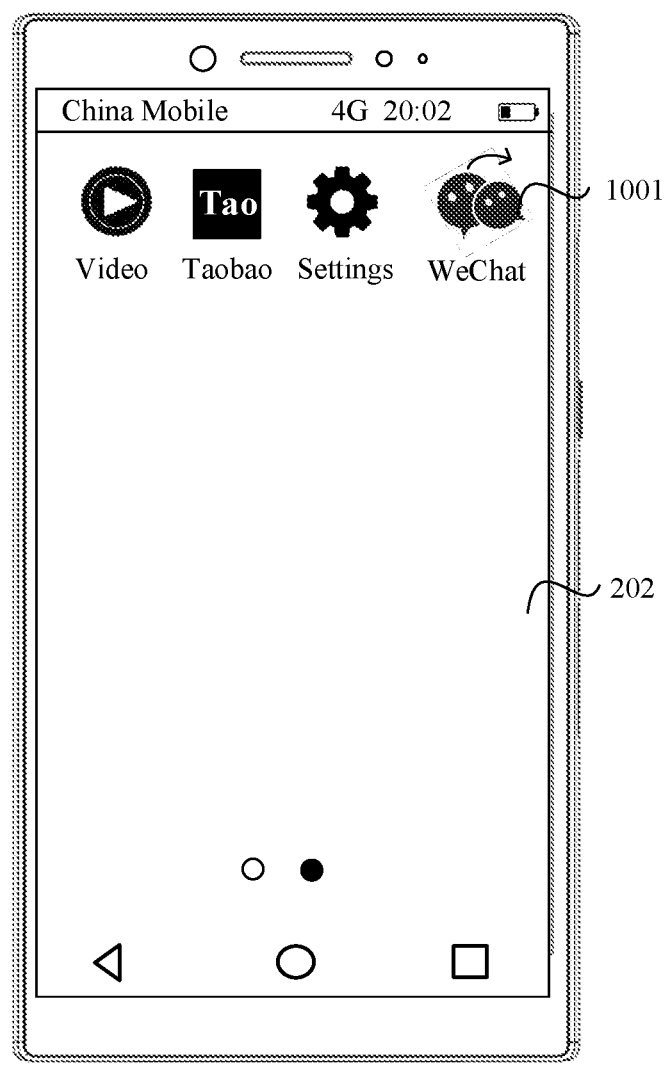

For example, when the terminal returns to the home screen (for example, the second display screen 202) on which the first application is located, the terminal may further mark the icon 1001 of the WECHAT® application on the second display screen 202. For example, as shown in FIG. 13(a), the terminal may highlight a boundary of the icon 1001 of the WECHAT® application (highlighting is represented by using a dashed line in FIG. 13(a)). For another example, as shown in FIG. 13(b), the terminal may rotate or shake the icon 1001 of the WECHAT® application, so that the user can accurately locate the location of the first application on the home screen.

Alternatively, the terminal may add some animation effects in a time period from exiting the first application to displaying the second display screen 202. For example, the terminal may add a dynamically changeable scale element, to improve fun and guidance when the application is exited.

For example, as shown in FIG. 5A to FIG. 5C, in a process from exiting the WECHAT® application by the terminal to displaying the second display screen 202 by the terminal, the terminal may use the second display screen 202 as a display background. In addition, the terminal may use the application screen 501 of the WECHAT® application as a scale element, and gradually scale down the scale element when displaying each frame of image, until the scale element disappears from the second display screen 202. When scaling down the application screen 501, the terminal may use any point (for example, a center point P of the second display screen 202) on the second display screen 202 as a scale center.

For another example, when obtaining specific location information of the WECHAT® application on the home screen, in addition to determining a specific display screen on which the icon 1001 of the WECHAT® application is located, the terminal may further determine specific location information of the icon 1001 of the WECHAT® application on the display screen. For example, as shown in FIG. 9(*c*), a specific location of the icon 1001 of the WECHAT® application on the second display screen 202 may be a point A on the second display screen 202.

As shown in FIG. 6A to FIG. 6C, in a process from exiting the WECHAT® application by the terminal to displaying the second display screen 202 by the terminal, the terminal may use the second display screen 202 as a display background. In addition, the terminal may use the application screen 501 of the WECHAT® application as a scale element, and gradually scale down the scale element when displaying each frame of image, until the scale element disappears from the second display screen 202. Different from FIG. 5A to FIG. 5C, in FIG. 6A to FIG. 6C, when scaling down the application screen 501, the terminal may use the location (for example, the point A) of the icon 1001 of the WECHAT® application on the second display screen 202 as a scale center.

For another example, in a process from exiting the WECHAT® application to displaying the second display screen 202, the terminal may display changeable specific content of the scale element, so that a more vivid animation effect can be presented to the user when the application is exited, and the user is guided to locate the exited first application on the home screen.

Figure 14A:
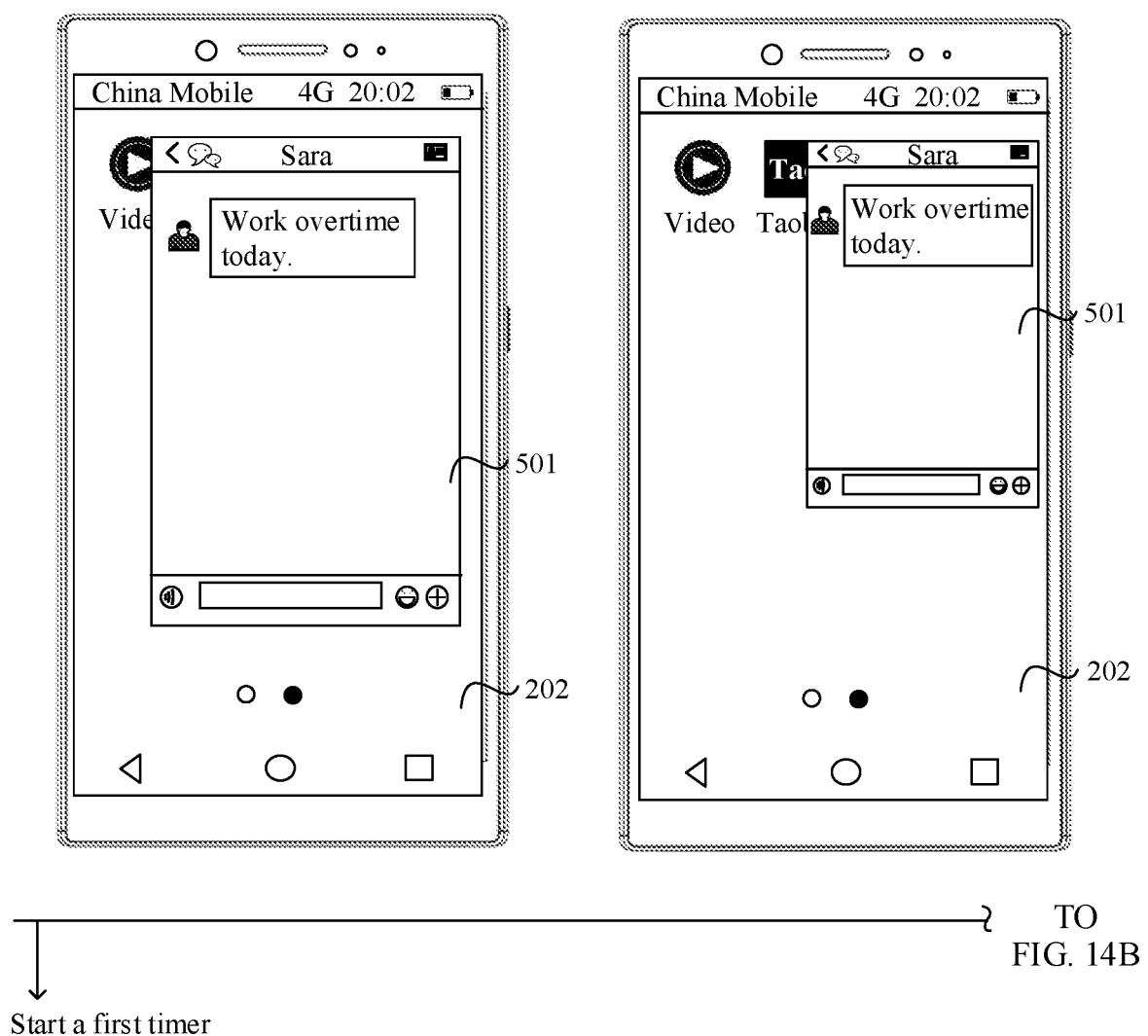
FIG. 14A to FIG. 14C are a schematic diagram 10 of a display scenario when an application is exited according to an embodiment of this application.
Figure 14B:
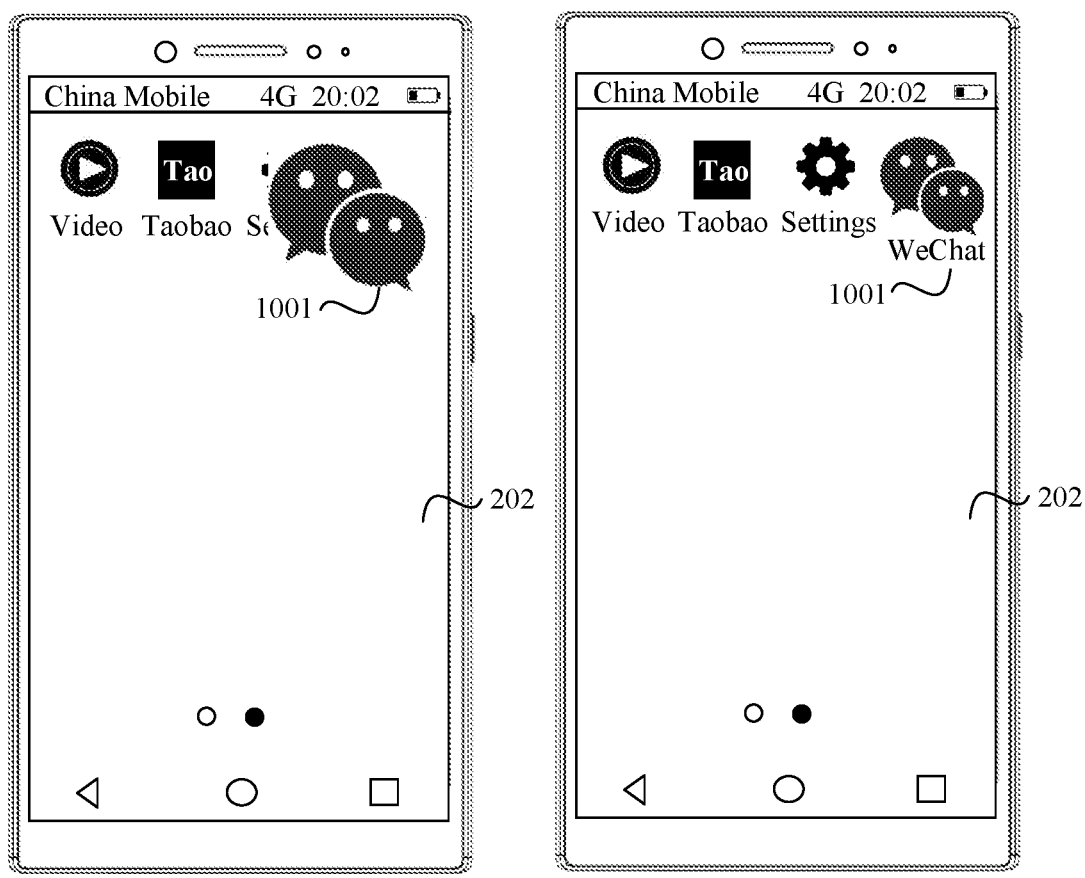
Figure 14C:
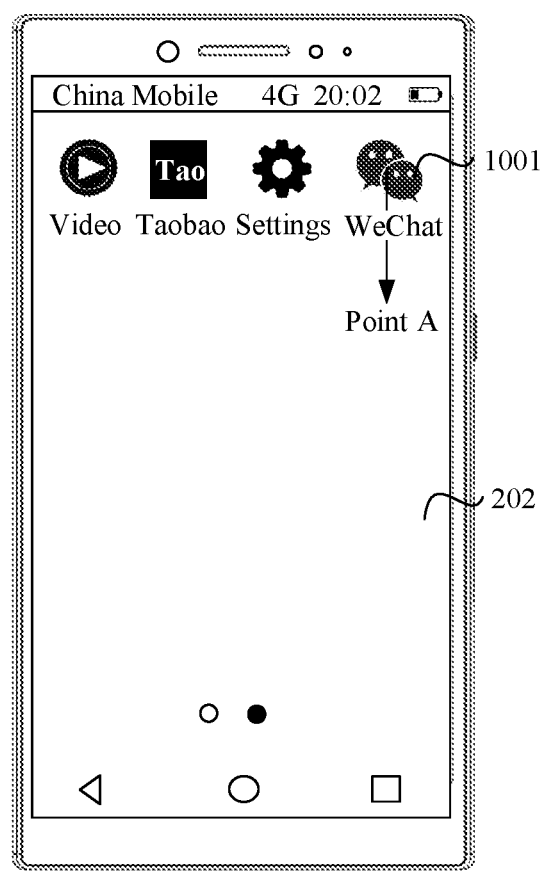

For example, duration from exiting the WECHAT® application by the terminal to displaying the second display screen 202 by the terminal may be 350 milliseconds. As shown in FIG. 14A to FIG. 14C, after the second operation of the user for exiting the WECHAT® application is received, after a preset time (for example, 100 milliseconds), the application screen 501 of the WECHAT® may be changed to an icon 1001 of the WECHAT® application with a second size, and the icon 1001 of the WECHAT® application with the second size may be scaled down to an icon 1001 of the WECHAT® application with a first size.

For example, the terminal may start a first timer whose duration is 100 milliseconds. In a time period before the first timer expires, the terminal may use the application screen 501 displayed when the WECHAT® application is exited as a first scale element, and gradually scale down the application screen 501 when displaying each frame of image. For example, a size of the application screen 501 in an $(N+1)^{th}$ frame of image (N is an integer greater than 0) may be set to X (X is a positive number less than 1) times of a size of the application screen 501 in an $N^{th}$ frame of image. In this way, the size of the application screen 501 in the $(N+1)^{th}$ frame of image is less than the size of the application screen 501 in the $N^{th}$ frame of image.

After the first timer expires, the terminal may start a second timer whose duration is 150 milliseconds. If a size of the icon 1001 of the WECHAT® application on the second display screen 202 is the first size, in a time period before the second timer expires, the terminal may use the icon 1001 of the WECHAT® application with the second size as a second scale element, and gradually scale down the second scale element. The second size is greater than the first size. For example, a size of the application screen 501 in an $(M+1)^{th}$ frame of image (M is an integer greater than N) may be set to Y (Y is a positive number less than 1) times of a size of the application screen 501 in an $M^{th}$ frame of image. In this way, in a continuous scaling down process, the icon 1001 of the WECHAT® application with the second size may finally become the icon 1001 of the WECHAT® application with the first size on the second display screen 202.

Alternatively, in a process of exiting the WECHAT® application, the terminal may further display the first scale element and the second scale element in a superimposition manner in a time period. For example, after starting the first timer for 90 milliseconds, the terminal may use the icon 1001 with the second size as the second scale element, and start to scale down the application icon 1001 by using the point A as a scale center. In this case, in a time period from a moment at which the first timer is started for 90 milliseconds to a moment at which the first timer expires, the terminal may use the second display screen 202 as a background, and display the first scale element and the second scale element in a superimposition manner. For example, the first scale element and the second scale element may have a same size in this time period.

In addition, transparency of a scale element (for example, the application screen 501 or the application icon 1001) may be further changed in a process of scaling down the scale element. For example, higher transparency may be set for a scale element with a smaller size, to implement a fade-in and fade-out animation effect.

Certainly, in addition to using time as a determining condition for determining whether to change a scale element, the terminal may also determine, based on a size of the scale element, whether to change the scale element. For example, in a process in which the terminal gradually scales down the first scale element, if the terminal detects that an area of the first scale element is less than a threshold, the terminal may replace the first scale element with the second scale element and continue to scale down the second scale element. This is not limited in this embodiment of this application.

In some other embodiments of this application, when exiting the second application, the terminal may further add a scale-up and scale-down animation effect, a fade-in and fade-out animation effect, or the like to the display background (for example, the second display screen 202). This is not limited in this embodiment of this application.

In conclusion, according to operations S801 to S804, when the user opens an application (namely, the first application) by using the target entrance other than the home screen, when exiting the first application, the terminal may still automatically return to the display screen on which the icon of the first application is located, to guide the user to quickly and accurately locate the first application on the home screen.

In some other embodiments of this application, if the user opens an application that belongs to a folder on the home screen, the terminal may also present a display effect of dynamically locating an application location when exiting the application in the folder.

Figure 15:
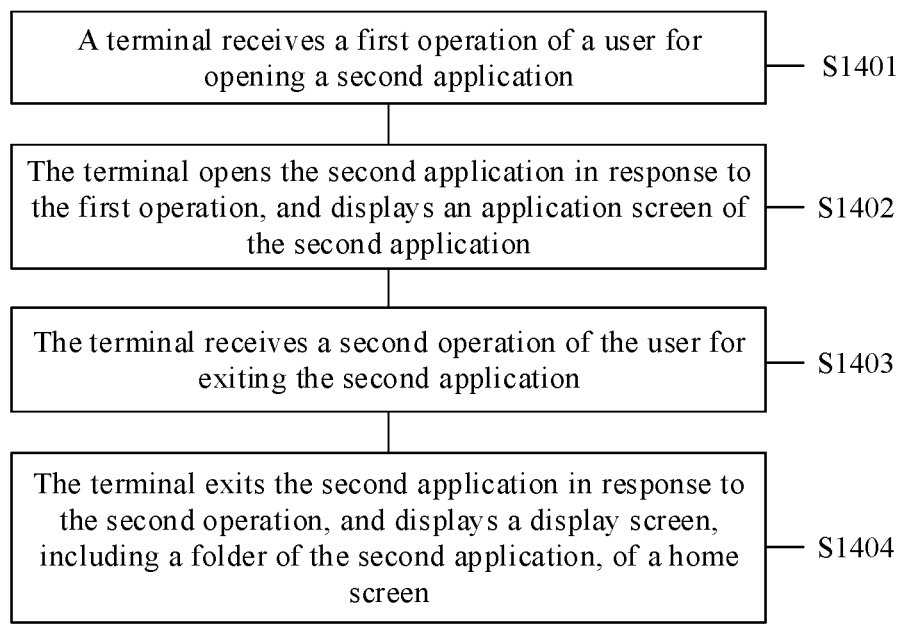
FIG. 15 is a flowchart 2 of a display method when an application is exited according to an embodiment of this application.

FIG. 15 is a flowchart of another display method when an application is exited according to an embodiment of this application. As shown in FIG. 15, the display method when the application is exited may include the following operations.

S1401: A terminal receives a first operation of a user for opening a second application.

A difference between this operation and operation S801 is that an icon of the second application is located in a folder on a home screen. In other words, the second application is an application added to a folder.

Another difference between this operation and operation S801 lies in the first operation based on which the user can open the second application by using the target entrance. For example, the user taps a notification message of the second application in a pull-down menu. Alternatively, the user may open the second application from the folder on the home screen. The first operation in operation S1401 is any operation for opening the second application, and the operation may be the same as or different from the first operation in operation S801.

Figure 16A:
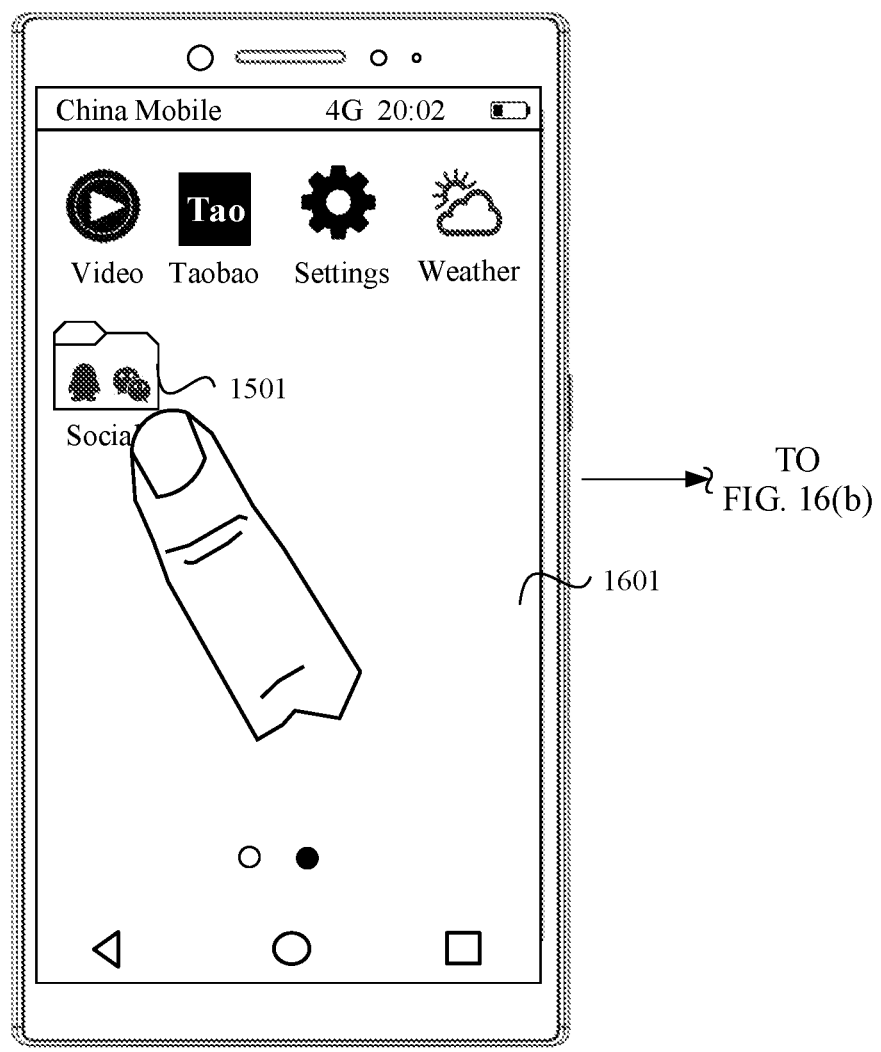
FIG. 16(a) and FIG. 16(b) are a schematic diagram 11 of a display scenario when an application is exited according to an embodiment of this application.
Figure 16B:
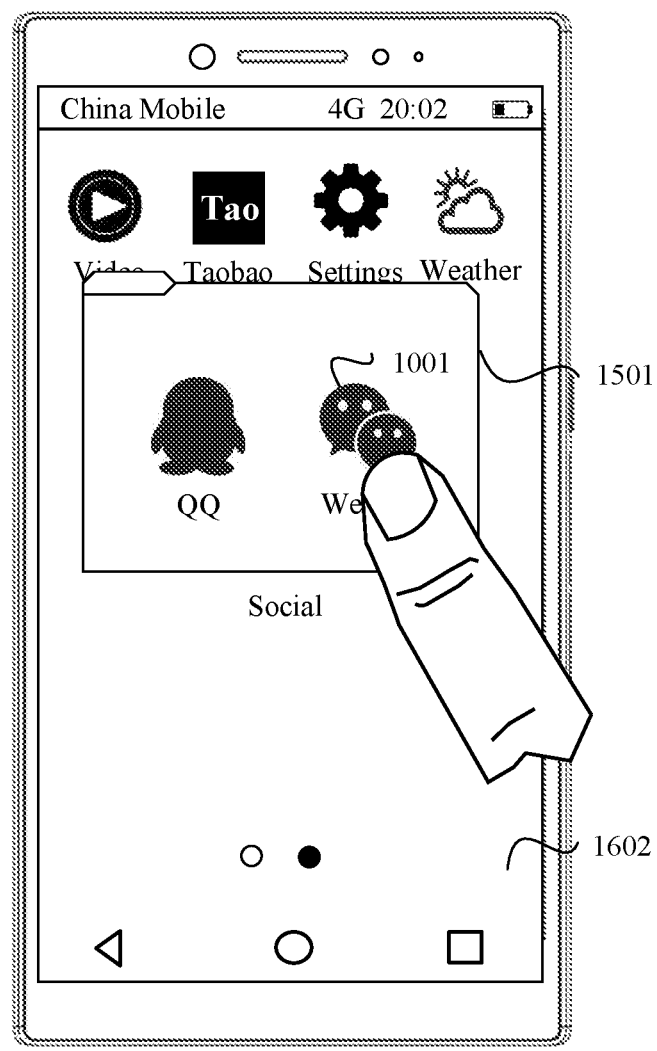

In an example in which a WECHAT® application is the second application, FIG. 16(a) shows a display screen 1601 including a folder 1501 on the home screen (FIG. 16(a) shows a second display screen 1601 including the folder 1501). If the terminal detects that the user selects the folder 1501 named "social" on the home screen, the terminal displays the target folder 1501 in an open state. FIG. 16(b) shows a display screen 1602 when the target folder 1501 is in an open state. The opened target folder 1501 includes icons of one or more applications. In this case, if the terminal detects that the user taps an icon 1001 of the WECHAT® application in the target folder 1501, the terminal may continue to perform the following operations S1402 to S1404.

In addition, a size of the folder 1501 in a closed state on the display screen 1601 is a first folder size, and a size of the icon of the second application (for example, the icon of the WECHAT® application) in the folder 1501 is a first icon size. Because the icon of the second application is located in the folder 1501, the first icon size is less than the first folder size.

S1402: The terminal opens the second application in response to the first operation, and displays an application screen of the second application.

S1403: The terminal receives a second operation of the user for exiting the second application.

For specific processes in which the terminal opens the second application, displays the application screen of the second application, and receives the second operation of the user for exiting the second application in operations S1402 and S1403, refer to related descriptions in operations S802 and S803. Details are not described herein again. The second operation in operation S1403 is any operation for exiting the second application, and the operation may be the same as or different from the second operation in operation S803.

S1404: The terminal exits the second application in response to the second operation, and displays a display screen of the home screen. The display screen includes the folder in which the icon of the second application is located, and in this case, the folder is in the closed state. The icon of the second application is located in the folder in the closed state.

Similar to operation S804, if the terminal detects that the user performs the second operation for exiting the second application, the terminal may obtain specific location information of the folder in which the second application is located and that is on the home screen.

Generally, when an icon of an application is added to a folder on the home screen, a home screen process sets a flag bit for the application to indicate whether the application is added to the folder. In this way, the terminal may query a flag bit of the second application by using the home screen process based on a package name of the second application, to determine whether the second application is added to a folder. After it is determined that the second application is added to the folder, the folder in which the second application is located may be further found by using the home screen process. For example, the folder in which the WECHAT® application is located is the folder 1501 named "social" in FIG. 16(a). Further, the terminal may determine, by using the home screen process, that the folder 1501 is specifically located on the display screen 1601 of the home screen.

When exiting the WECHAT® application, the terminal may return to the display screen 1601 on which the folder 1501 is located. In this way, regardless of an entrance by using which the user opens the second application, when exiting the second application, the terminal may directly return to the home screen on which the folder including the icon of the second application is located.

In some embodiments of this application, the terminal may further add a dynamically changeable scale element in a time period from exiting the second application to displaying the display screen 1601, to implement an animation effect when the application is exited.

Figure 17A:
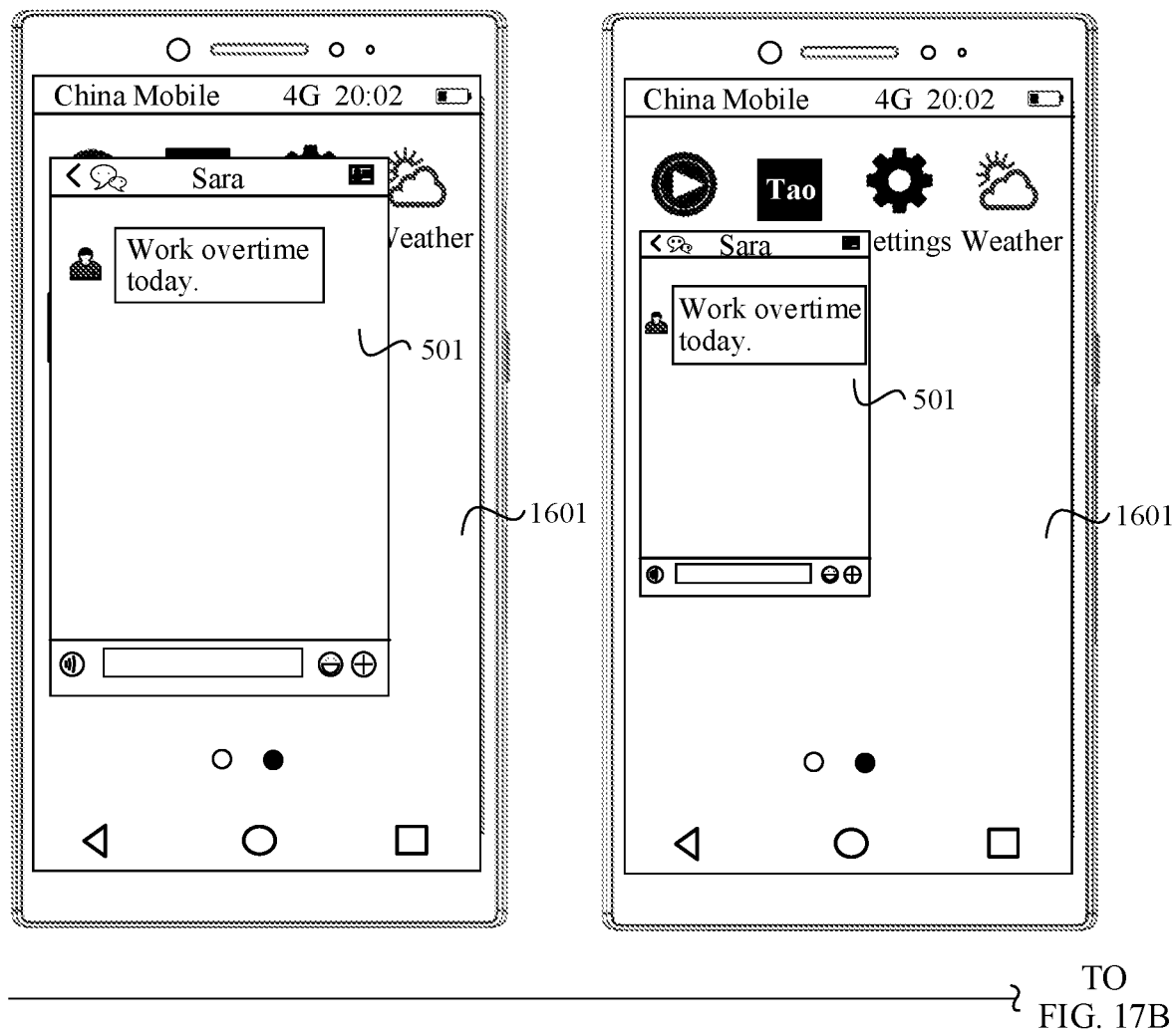
FIG. 17A and FIG. 17B are a schematic diagram 12 of a display scenario when an application is exited according to an embodiment of this application.
Figure 17B:
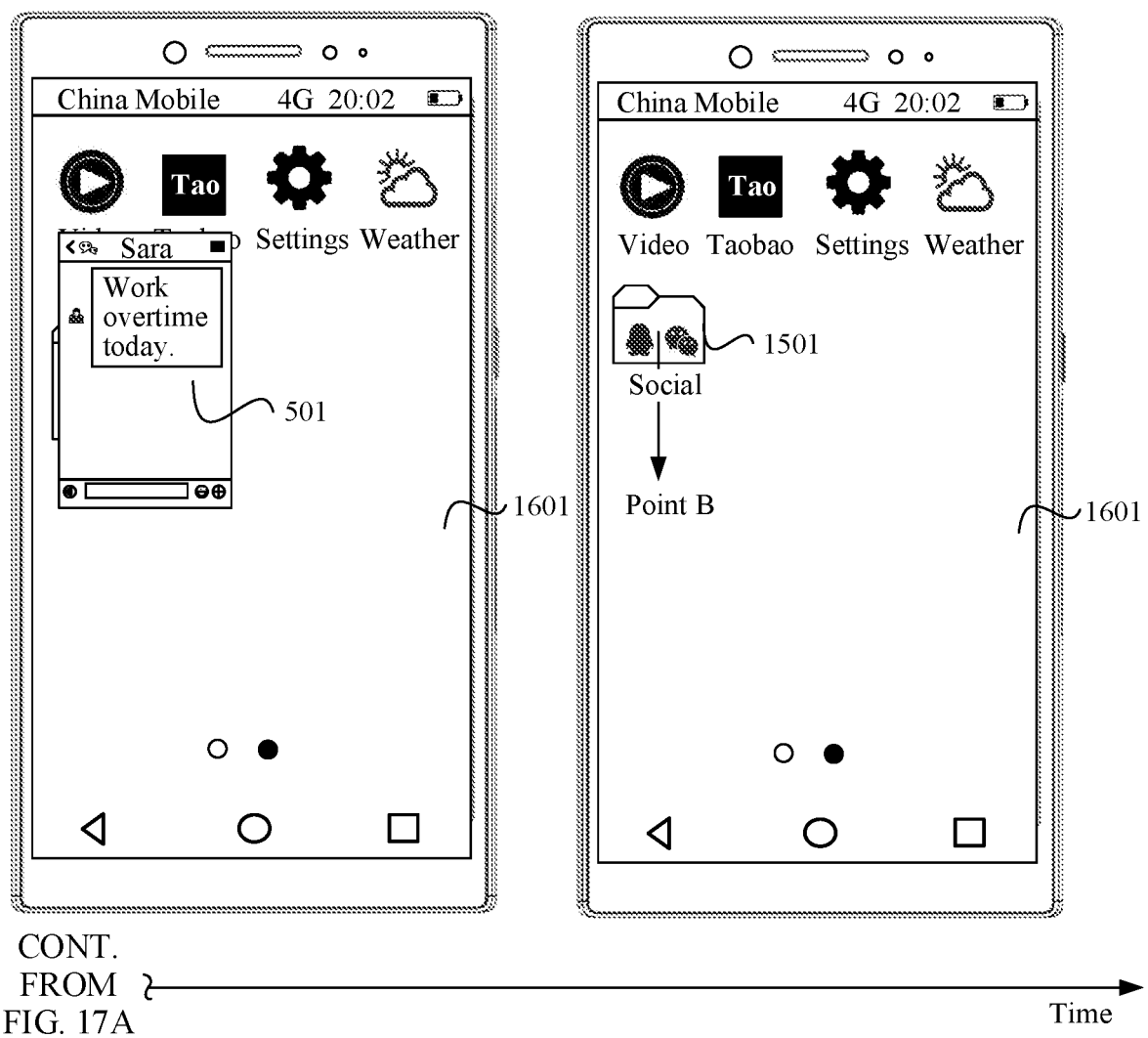

Still in an example in which the WECHAT® application in the folder 1501 is the second application, as shown in FIG. 17A and FIG. 17B, when exiting the WECHAT® application, the terminal may use the display screen 1601 as a display background, use an application screen 501 of the WECHAT® application as a scale element, and gradually scale down the scale element when displaying each frame of image, until the scale element disappears from the display screen 1601. In a process of scaling down the application screen 501, the terminal may use a location of the folder 1501 (for example, a center point B of the folder 1501) on the display screen 1601 as a scale center.

Figure 18A:
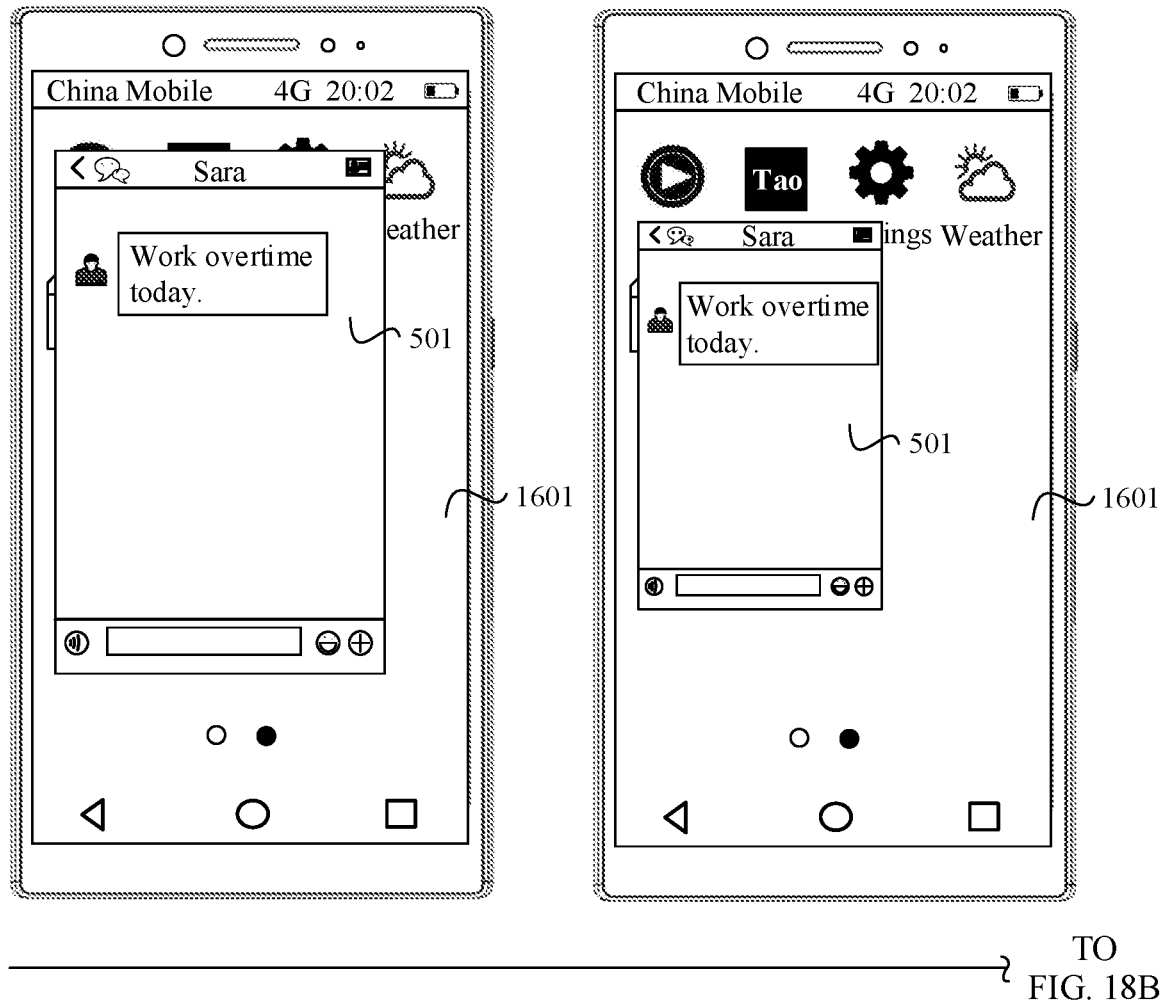
FIG. 18A and FIG. 18B are a schematic diagram 13 of a display scenario when an application is exited according to an embodiment of this application.
Figure 18B:
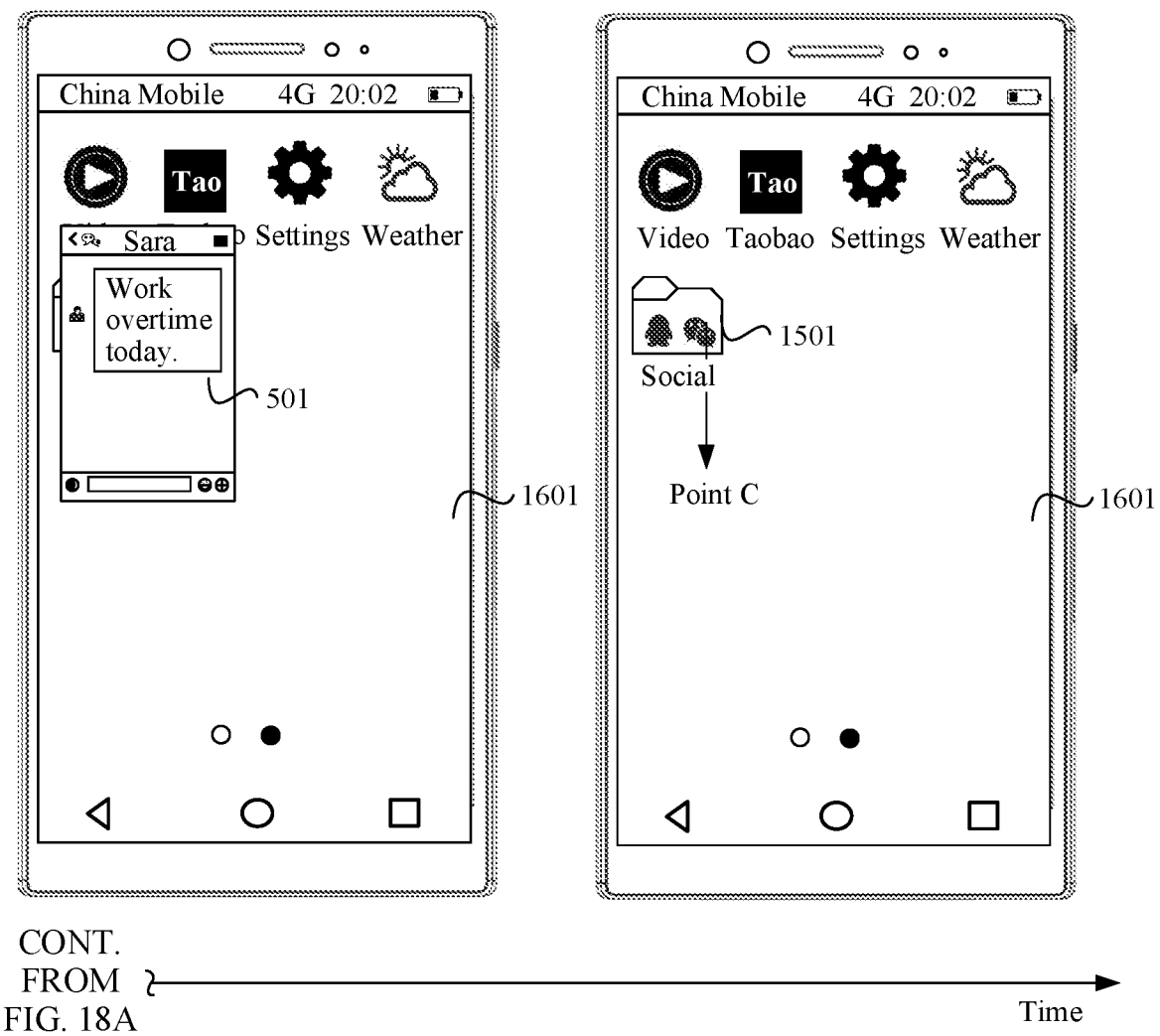

For another example, as shown in FIG. 18A and FIG. 18B, the terminal may use the display screen 1601 as a display background, use an application screen 501 of the WECHAT® application as a scale element, and gradually scale down the scale element when displaying each frame of image, until the scale element disappears from the display screen 1601. Different from FIG. 18, in FIG. 18A and FIG. 18B, when scaling down the application screen 501, the terminal may use a location of the WECHAT® application in the folder 1501 (for example, a center point C of the icon of the WECHAT® application) as a scale center.

Certainly, in addition to the application screen 501 of the WECHAT® application, the scale element may further include a graph such as the icon 1001 of the WECHAT® application. The scale center may be any location on the display screen 1601. This is not limited in this embodiment of this application.

In some other embodiments of this application, in a process from exiting the WECHAT® application by the terminal to displaying the display screen 1601 by the terminal, the terminal may display changeable specific content of the scale element.

Figure 19A:
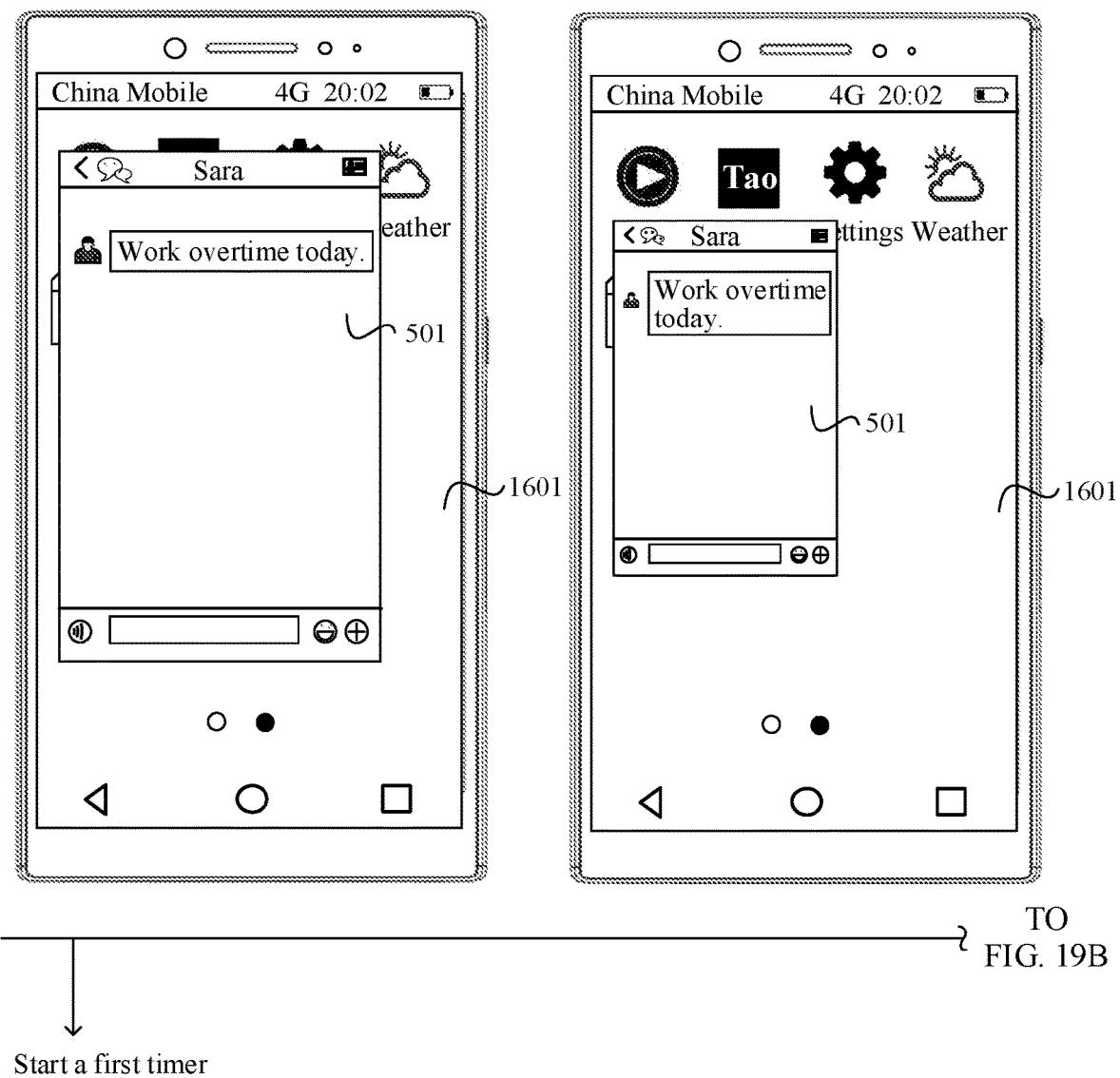
FIG. 19A and FIG. 19B are a schematic diagram 14 of a display scenario when an application is exited according to an embodiment of this application.
Figure 19B:
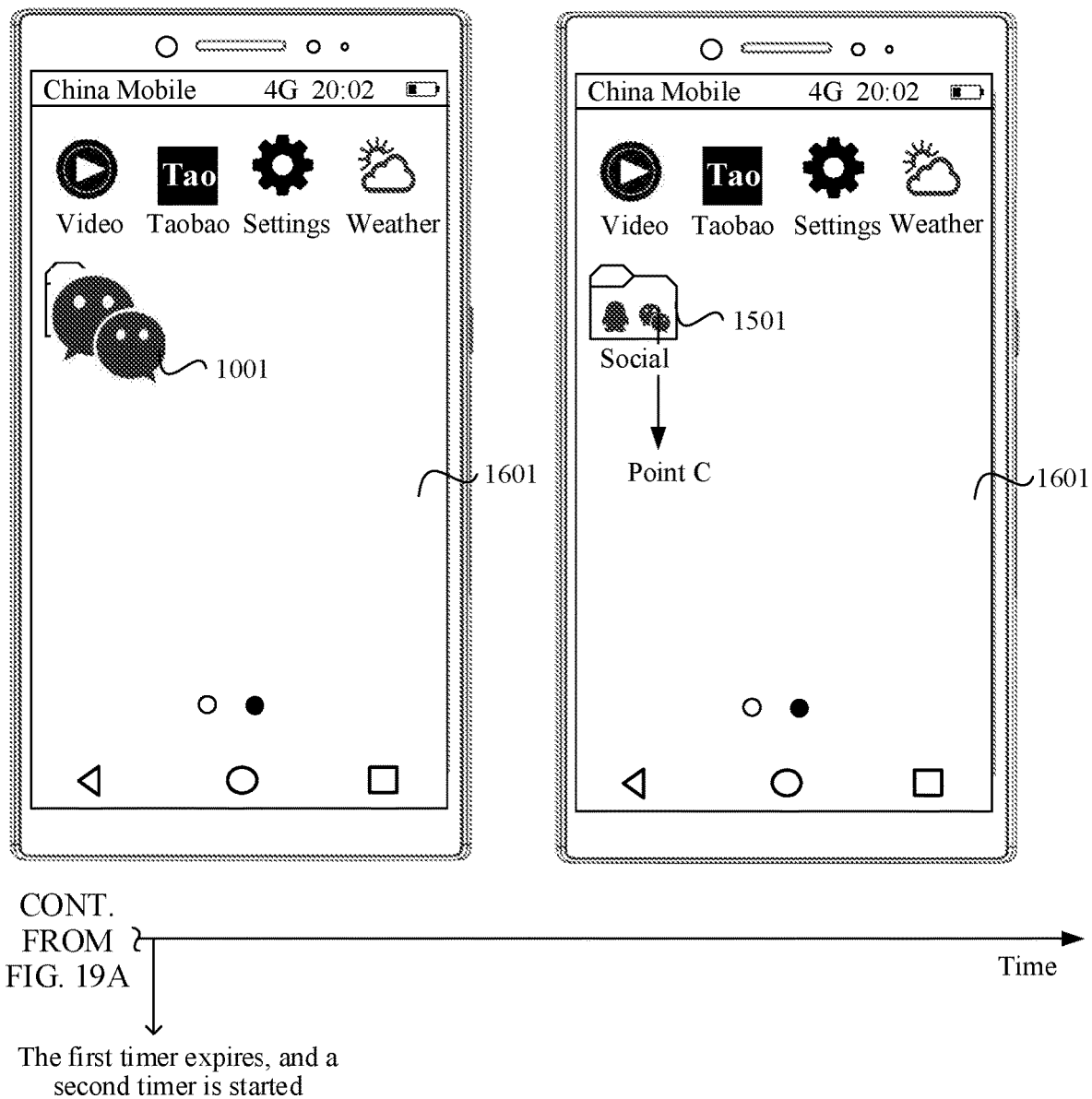

For example, as shown in FIG. 19A and FIG. 19B, the terminal may start a first timer when exiting the WECHAT® application. In a time period before the first timer expires, the terminal may use the application screen 501 of the WECHAT® application as a first scale element, and gradually scale down the first scale element. After the first timer expires, the terminal may start a second timer. In a time period before the second timer expires, the terminal may use the icon 1001 of the WECHAT® application as a second scale element, and scale down the second scale element. In this case, a size of the icon 1001 of the WECHAT® application is a second icon size (the second icon size is greater than the first icon size in operation S1401). In this way, in a continuous scaling down process, the icon 1001 with the second icon size may finally become an icon 1001 with the first icon size on the display screen 1601.

For a specific method by using which the terminal scales down the first scale element and the second scale element, refer to related descriptions in FIG. 14A to FIG. 14C. Therefore, details are not described herein again. It may be understood that timing duration of the first timer and timing duration of the second timer are not limited in this embodiment of this application.

In some other embodiments of this application, when exiting the second application, the terminal may further exit the second application and return to the folder in which the second application is located. In this case, the folder is in the open state. Then, the terminal returns, from the opened folder, to the display screen on which the folder is located. In this case, the folder is in the closed state. A size of the folder in the open state (that is, a second folder size) is greater than the first folder size of the folder in the closed state.

Figure 20A:
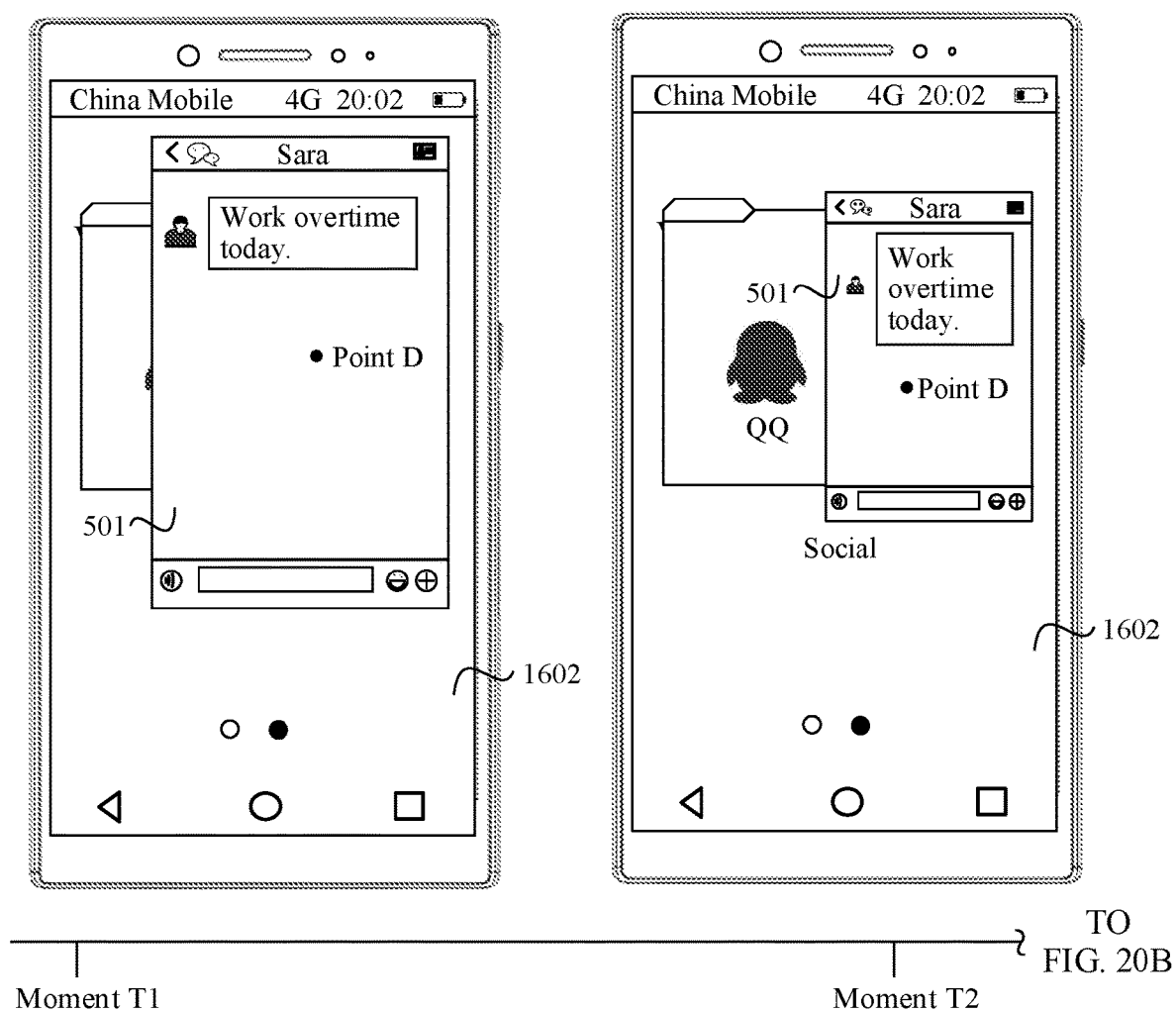
FIG. 20A and FIG. 20B are a schematic diagram 15 of a display scenario when an application is exited according to an embodiment of this application.
Figure 20B:
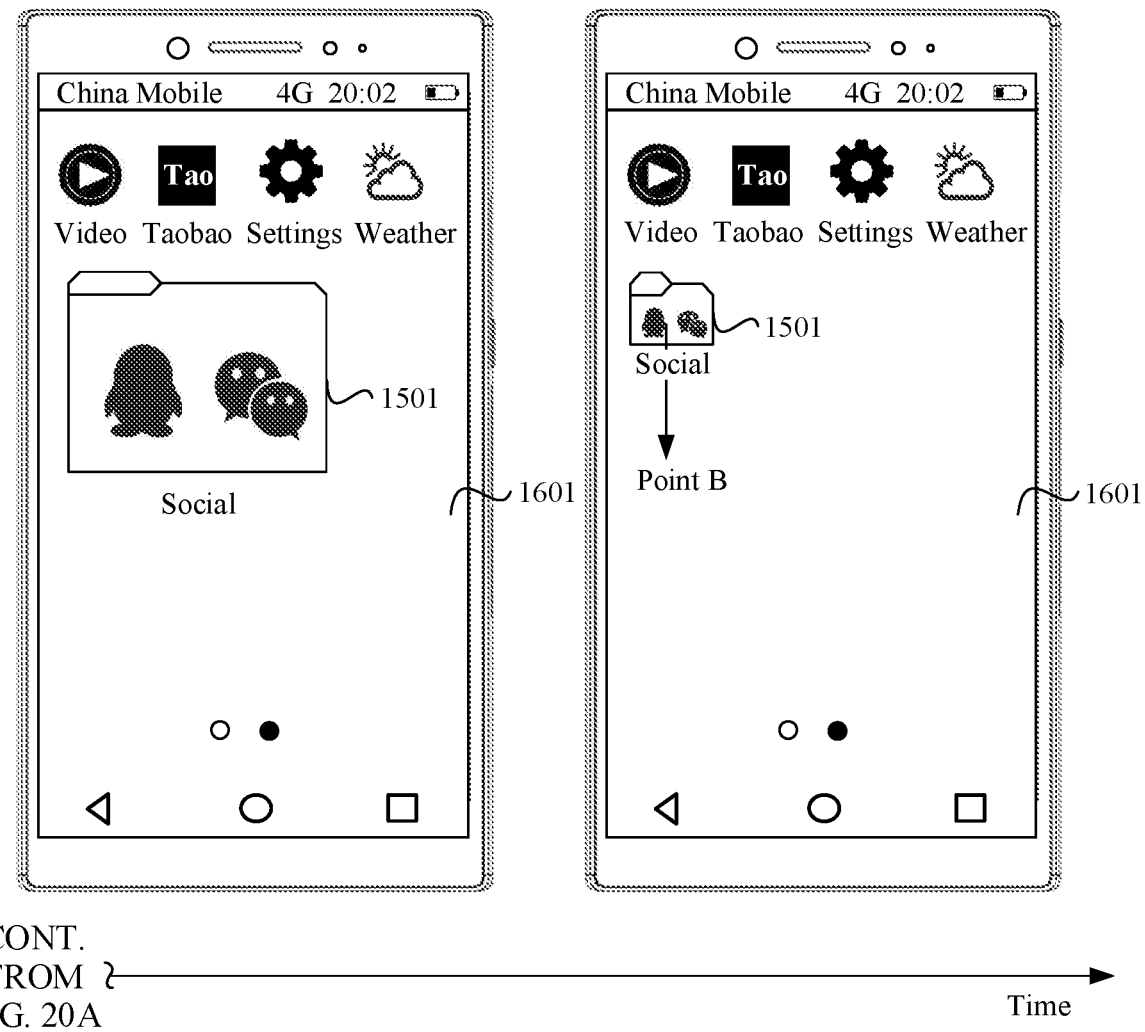

For example, when exiting the WECHAT® application (for example, at a moment T1), as shown in FIG. 20A and FIG. 20B, the terminal may first use the display screen 1602 on which the folder 1501 in the open state is located as a display background, and use the application screen 501 displayed when the WECHAT® application is displayed as a scale element, and gradually scale down the application screen 501 of the WECHAT® application when displaying each frame of image.

When scaling down the application screen 501 into the opened folder 1501 (for example, at a moment T2, where T2 is greater than T1), the terminal may change the scale element to the folder 1501 in the open state, namely, the folder 1501 with the second folder size. In addition, the terminal may change the display background to the display screen 1601 on which the folder 1501 in the closed state is located, and gradually scale down the folder 1501 with the second folder size when displaying each frame of image. In this way, in a continuous scaling down process, the folder 1501 with the second folder size may finally become the folder 1501 with the first folder size on the display screen 1601. It can be learned that a process in which the terminal exits the WECHAT® application is in full correspondence with a process in which the user opens the WECHAT® application on the home screen. This can improve friendliness of interaction between the terminal and the user while helping the user locate the WECHAT® application.

When the folder 1501 is in the open state, the folder 1501 includes an icon of at least one application, for example, the icon 1001 of the WECHAT® application. In this case, a size of the icon 1001 of the WECHAT® application is a third icon size. Optionally, the third icon size may be equal to the size of the folder 1501 in the closed state (namely, the first folder size).

It may be understood that after the moment T2, a graph such as the icon of the WECHAT® application may be further used as the scale element. In addition, in a time period from T1 to T2, the terminal may use any point on the folder 1501 in the open state as the scale center, and after the moment T2, the terminal may use any point on the folder 1501 in the closed state as the scale center. A specific form of the scale element and a specific location of the scale center corresponding to the scale element are not limited in this embodiment of this application.

It may be understood that, in operation S1404, the terminal receives the second operation for exiting the second application, automatically scales down the application screen of the second application, and finally displays the display screen. The display screen includes the folder in which the icon of the second application is located.

After the application screen of the second application is automatically scaled down, the application screen of the second application may be automatically changed to the folder in the open state after a preset time (for example, 90 milliseconds), and then the folder in the open state may be automatically changed to the folder in the closed state. The folder in the closed state is displayed on the display screen, and the icon of the second application is located in the folder in the closed state.

After the application screen of the second application is automatically scaled down, the application screen of the second application may be automatically changed to the folder in the closed state after a preset time (for example, 180 milliseconds). The folder in the closed state is displayed on the display screen, and the icon of the second application is located in the folder in the closed state.

In addition to using time as a determining condition for determining whether to change the scale element, the terminal may determine, based on a size of the scale element, to change the scale element. For example, in a process in which the terminal gradually scales down the application screen 501, if the terminal detects that an area of the application screen 501 is less than a threshold, the terminal may replace the application screen 501 with the folder 1501 as the scale element and continue to scale down the folder 1501. This is not limited in this embodiment of this application.

In some other embodiments of this application, when exiting the second application, the terminal may further add a scale-up and scale-down animation effect, a fade-in and fade-out animation effect, or the like to the display background (for example, the display screen 1601 or the display screen 1602). This is not limited in this embodiment of this application.

According to operations S1401 to S1404, regardless of whether the user opens the second application from the folder on the home screen or the user opens the second application by using a target entrance other than the home screen, when exiting the second application, the terminal may return to the display screen on which the folder of the second application is located, to guide the user to quickly and accurately locate the second application on the home screen.

Figure 21:
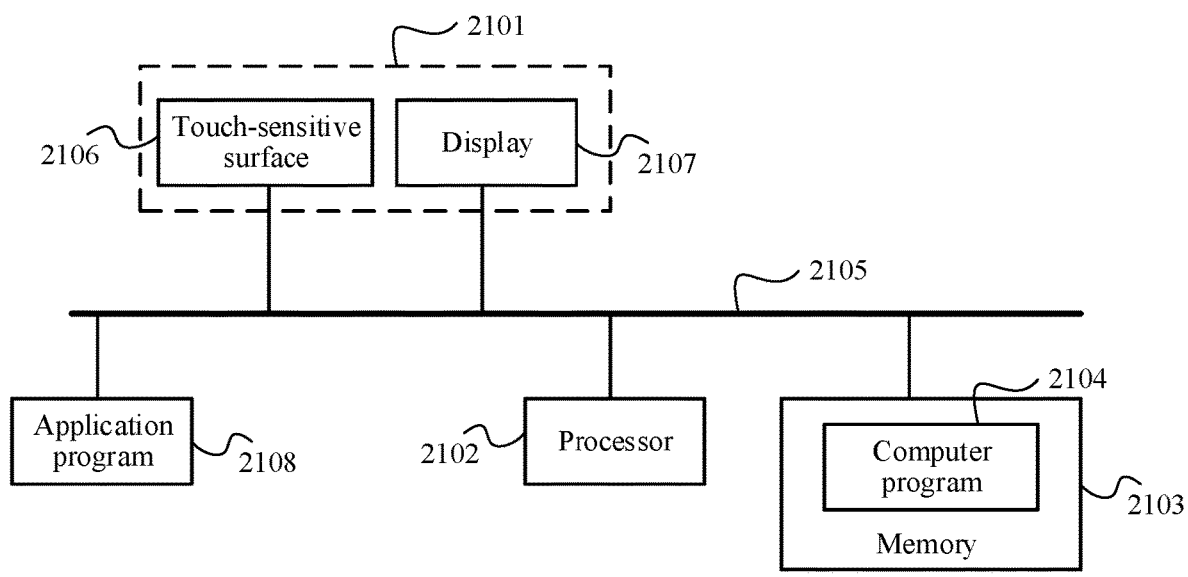
FIG. 21 is a schematic diagram 2 of a terminal according to an embodiment of this application.

Some other embodiments of this application disclose a terminal. As shown in FIG. 21, the terminal may include a touchscreen 2101, one or more processors 2102, a memory 2103, a plurality of applications 2108, and one or more computer programs 2104. The touchscreen 2101 includes a touch-sensitive surface 2106 and a display 2107. The foregoing components may be connected by using one or more communications buses 2105.

The one or more computer programs 2104 are stored in the memory 2103 and are executed by the one or more processors 2102. The one or more computer programs 2104 include an instruction, and the instruction may be used to perform the operations in the corresponding embodiment in FIG. 8 or FIG. 15.

Figure 22:
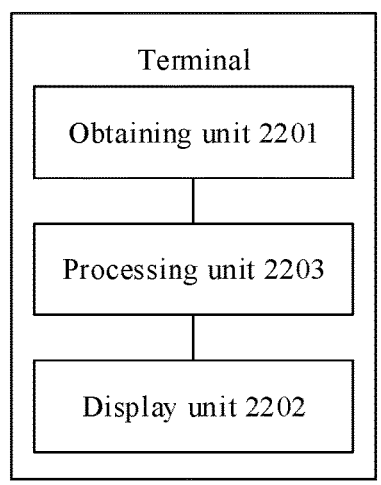
FIG. 22 is a schematic diagram 3 of a terminal according to an embodiment of this application.

When each function module is obtained through division based on each corresponding function, FIG. 22 is a schematic structural diagram of the terminal in the foregoing embodiment, and the terminal may include an obtaining unit 2201, a display unit 2202, and a processing unit 2203.

The obtaining unit 2201 is configured to support the terminal to perform S801 and S803 shown in FIG. 8 and S1401 and S1403 shown in FIG. 15. The display unit 2202 and the processing unit 2203 are configured to support the terminal to perform S802 and S804 shown in FIG. 8 and S1402 and S1404 shown in FIG. 15. All related content of the operations in the foregoing method embodiments may be cited in function descriptions of corresponding function modules. Details are not described herein again.

An embodiment of this application further provides a computer storage medium. The computer storage medium stores computer program code. When the processor executes the computer program code, the terminal performs related method operations in FIG. 8 or FIG. 15 to implement the display method when an application is exited in the foregoing embodiments.

An embodiment of this application further provides a computer program product. When the computer program product is run on a computer, the computer is enabled to perform the related method operations in FIG. 8 or FIG. 15 to implement the display method when an application is exited in the foregoing embodiments.

The terminal, the computer storage medium, or the computer program product provided in the embodiments of this application are all configured to perform the foregoing corresponding methods. Therefore, for beneficial effects that can be achieved, refer to the beneficial effects in the foregoing corresponding methods. Details are not described herein again.

It should be noted that the first application and the second application mentioned above are merely intended to distinguish between different embodiments, and should not constitute a limitation on the embodiments of the present invention. In different embodiments, the first application and the second application may be a same application, or certainly may be different applications.

It may be understood that the embodiments of the present invention are described based on the accompanying drawings in this specification. Each of the accompanying drawings in the specification may be understood as an embodiment.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing apparatus and unit, refer to a corresponding process in the foregoing method embodiments. Details are not described herein again.

Function units in the embodiments of this application may be integrated into one processing unit, or each of the units may exist alone physically, or two or more units are integrated into one unit. The integrated unit may be implemented in a form of hardware, or may be implemented in a form of software and hardware.

When a function the integrated unit is implemented in the form of software and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes any medium that can store program code, such as a flash memory, a removable hard disk, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method of displaying exiting applications, comprising:
   receiving, by a terminal, a keyword entered by a user into a search bar on a first display screen on the terminal;
   displaying, by the terminal, a search result associated with the keyword on the first display screen on the terminal, wherein the search result includes a first icon of an application, wherein the application is located on a second display screen on the terminal, wherein the second display screen is one of a plurality of sub-screens of a home screen of the terminal;
   receiving, by the terminal, a first operation on the first icon of the application from the user for starting the application from the search result;
   starting, by the terminal, the application on an application screen in response to the first operation on the first icon of the application displayed on the first display screen;
   receiving, by the terminal, a second operation from the user for exiting the application that is running on the application screen on the first display screen;
   obtaining, by the terminal, a location of the application on the second display screen in response to the second operation;
   scaling down, by the terminal, the application screen from the first display screen to a second icon of the application on the second display screen using the location of the application as a scale center, wherein the scaling down of the application screen includes sequentially displays each of a plurality of image frames of the application screen with a decreasing size until the application screen disappears into the second icon of the application on the second display screen; and
   highlighting, by the terminal, the second icon of the application on the second display screen with one or more features.

2. The method according to claim 1, wherein the search bar is located on one of a plurality of sub-screens of a home screen, a home screen assistant, a pull-down menu, or a pull-up menu of the terminal.

3. The method according to claim 1, wherein the search result further comprises a link to the application.

4. The method according to claim 1,
   wherein the scaling down of the application screen of the application exposes the second display screen on which the second icon of the application is located.

5. The method according to claim 4, wherein after the scaling down of the application screen and before the displaying of the second display screen, the method further comprises:
   changing, by the terminal, the scaled-down application screen to a third icon of the application, wherein the third icon of the application has a size that is not less than a size of the second icon of the application.

6. The method according to claim 5, wherein after the changing of the scaled-down application screen to the third icon of the application, the method further comprises:

scaling down, by the terminal, the third icon of the application with a size that is greater than a size of the second icon of the application.

7. A terminal, comprising:
one or more processors;
a memory;
an input device; and
a display;
wherein the memory, the input device, and the display are coupled to the one or more processors, the memory is configured to store program instructions, which, when executed by the one or more processors, cause the one or more processors to perform operations comprising:
receiving, at the input device, a keyword entered by a user into a search bar on a first display screen on the terminal,
displaying a search result associated with the keyword on the first display screen of the display, wherein the search result includes a first icon of an application, wherein the application is located on a second display screen on the terminal, wherein the second display screen is one of a plurality of sub-screens of a home screen of the terminal,
receiving a first operation on the first icon of the application from the user for starting the application from the search result,
starting the application on an application screen in response to the first operation on the first icon of the application displayed on the first display screen,
receiving a second operation from the user for exiting the application that is running on the application screen on the first display screen,
obtaining a location of the application on the second display screen in response to the second operation;
scaling down the application screen on the first display screen to a second icon of the application on the second display screen using the location of the application as a scale center, wherein the scaling down of the application screen includes sequentially displays each of a plurality of image frames of the application screen with a decreasing size until the application screen disappears into the second icon of the application on the second display screen, and
highlighting, by the terminal, the second icon of the application on the second display screen with one or more features.

8. The terminal according to claim 7,
wherein the scaling down of the application screen of the application exposes the second display screen on which the second icon of the application is located.

9. The terminal according to claim 8, the operations further comprising:
changing the scaled-down application screen to a third icon of the application with a size that is not less than a size of the second icon of the application.

10. The terminal according to claim 7, wherein the search bar is located on one of a plurality of sub-screens of a home screen, a home screen assistant, a pull-down menu, or a pull-up menu of the terminal.

11. The terminal according to claim 7, wherein the search result further comprises a link to the application.

12. A non-transitory machine-readable medium having instructions stored therein, which when executed by a processor, cause the processor to perform operations, the operations comprising:
receiving, by a terminal, a keyword entered by a user into a search bar on a first display screen on the terminal;
displaying, by the terminal, a search result associated with the keyword on the first display screen on the terminal, wherein the search result includes a first icon of an application, wherein the application is located on a second display screen on the terminal, wherein the second display screen is one of a plurality of sub-screens of a home screen of the terminal;
receiving, by the terminal, a first operation on the first icon of the application from the user for starting the application from the search result;
starting, by the terminal, the application on an application screen in response to the first operation on the first icon of the application displayed on the first display screen;
receiving, by the terminal, a second operation from the user for exiting the application that is running on the application screen on the first display screen;
obtaining, by the terminal, a location of the application on the second display screen in response to the second operation;
scaling down, by the terminal, the application screen from the first display screen to a second icon of the application on the second display screen using the location of the application as a scale center, wherein the scaling down of the application screen includes sequentially displays each of a plurality of image frames of the application screen with a decreasing size until the application screen disappears into the second icon of the application on the second display screen; and
highlighting, by the terminal, the second icon of the application on the second display screen with one or more features.

13. The non-transitory machine-readable medium of claim 12, wherein the search bar is located on one of a plurality of sub-screens of a home screen, a home screen assistant, a pull-down menu, or a pull-up menu of the terminal.

14. The non-transitory machine-readable medium of claim 12, wherein the search result further comprises a link to the application.

15. The non-transitory machine-readable medium of claim 12, wherein the scaling down of the application screen of the application exposes the second display screen on which the second icon of the application is located.

16. The non-transitory machine-readable medium according to claim 15, wherein after the scaling down of the application screen and before the displaying of the second display screen, the method further comprises:
changing, by the terminal, the scaled-down application screen to a third icon of the application, wherein the third icon of the application has a size that is not less than a size of the second icon of the application.

17. The non-transitory machine-readable medium of claim 16, wherein after the changing of the scaled-down application screen to the third icon of the application, the method further comprises:
scaling down, by the terminal, the third icon of the application a size that is greater than a size of the second icon of the application.

* * * * *